United States Patent [19]

Moriga et al.

[11] Patent Number: 4,497,720

[45] Date of Patent: Feb. 5, 1985

[54] METHOD FOR TREATING METALLIC OR CERAMIC SURFACES AT HIGH TEMPERATURES

[75] Inventors: Hiroyuki Moriga, Takatsuki; Masao Uchida, Ibaraki; Koichi Iwashita; Shuji Tanaka, both of Matsuyama, all of Japan

[73] Assignee: Teijin Limited, Osaka, Japan

[21] Appl. No.: 526,586

[22] Filed: Aug. 26, 1983

[30] Foreign Application Priority Data

| Apr. 10, 1982 [JP] | Japan | 57-173263 |
| May 10, 1982 [JP] | Japan | 57-173986 |
| Jun. 10, 1982 [JP] | Japan | 57-174444 |
| Aug. 27, 1982 [JP] | Japan | 57-147793 |
| May 31, 1983 [JP] | Japan | 58-94971 |

[51] Int. Cl.³ ............................................. C10M 1/30
[52] U.S. Cl. ..................................... 252/52 A; 252/54
[58] Field of Search ............................... 252/52 A, 54

[56] References Cited

U.S. PATENT DOCUMENTS

| 3,829,508 | 8/1974 | Diery et al. | 252/54 |
| 4,174,461 | 11/1979 | Sianesi et al. | 252/54 |
| 4,308,063 | 12/1981 | Horiuchi et al. | 252/52 A |
| 4,430,234 | 2/1984 | Hasegawa et al. | 252/52 A |

*Primary Examiner*—Jacqueline V. Howard
*Attorney, Agent, or Firm*—Sughrue, Mion, Zinn, Macpeak, & Seas

[57] ABSTRACT

A novel method is provided for treating metallic or ceramic surfaces (hot plates, metallic molds and the like) at a high temperature of 200° C. or above, wherein organic treating agents (finishes, release agents and the like) will not form a tar or sludge. According to this method, the continuous operation can be conducted due to neither staining on the metallic surfaces nor stop of the machine for a heater cleaning. Examples of the organic treating agents to be used include a polyalkylene glycol thermally decomposable at 150° C. or above in air and a fluorine-containing compound, preferably the nonionic type, having a fluoroalkyl group in the molecule.

13 Claims, No Drawings

METHOD FOR TREATING METALLIC OR CERAMIC SURFACES AT HIGH TEMPERATURES

BACKGROUND OF THE INVENTION (1) Field of the Invention

This invention relates to a method for treating metallic or ceramic surfaces kept at a high temperature of 200° C. or above. More particularly, it relates to a method for treating uniformly metallic or ceramic surfaces comprising applying a lubricating composition comprising 50% by weight or more of a polyalkylene glycol or a derivative thereof thermally decomposable at 150° C. or above in air with at least one specific fluorine-containing compound having a fluoroalkyl group in the molecule to the metallic or ceramic surfaces ordinarily used at 200° C. or above, and treating the metallic or ceramic surfaces while thermally decomposing the polyalkylene glycol or derivative thereof.

(2) Description of the Prior Art

It is well known that polyalkylene glycols have hithereto been used as a lubricant used in high-temperature parts such as internal combustion engines, or dryers, cement roasting furnaces, glass smelting furnaces, or the like since lubricants consisting essentially of polyalkylene glycols generally have improved lubricity at low temperatures or produce less residues as a sludge than any other lubricant on decomposition at a relatively high temperature. Polyalkylene glycols or derivatives thereof, however, are readily oxidized at high temperatures as is generally well known, and an antioxidant even in a large amount is incapable of providing the effect thereof for a long term. Therefore, large amounts of sludges are rather formed. In any case, polyalkylene glycols or derivatives thereof are usually unfit for use at high temperatures. For example, the following facts are known:

The decomposition starts by heating at 150° C. or above in air for 24 hours. The higher the temperature or the higher the content of the copolymerized polyprolylene oxide in polyalkylene glycols, the higher is the decomposition rate. Thus, sludges are formed by the decomposition, and the lubricity is remarkably deteriorated. Therefore, not only in the case of polyalkylene glycols but in general, additives are known for solubilizing and dispersing sludge formed on metallic surfaces to reduce the disadvantages caused by the formation of the sludges even a little, for example, to prevent the sticking of sludges to the metallic surfaces.

Examples of the additives include copolymers such as lauryl methacrylate, diethylaminoethyl methacrylate and the like lately known as ashless high polymeric additives. Methods using the additives may be effective for applications wherein the metallic surfaces are always dipped in a solution at a relatively low temperature and locally or temporarily heated. It has been suggested that metallic surfaces be coated with an adsorbed film of sulfonates or phosphates to prevent the deposition of soot or resins thereon. However, the following disadvantages are usually caused:

All these methods are ineffective in applications wherein the metallic surfaces are always used at a high temperature of 200° C. or above due to the thermal decomposition of the additives as such, and the formation of sludges is rather remarkably increased. The sticking of sludges on the metallic surfaces is also increased to deteriorate the lubricity, whereby cleaning should be frequently carried out.

On the other hand, silicone oil, mineral oil paraffin wax, fatty acid derivatives, talc, mica and the like as solid powders are often described as release agents in a relatively low temperature region from the viewpoint of improving only the release properties of the metallic surfaces. The term "release properties" herein used means the properties of removing sludges from surfaces. Mineral oil, however, will be not only fit for the use at 200° C. or above but also emit much smoke and form large amounts of sludges after the lapse of a long time. Therefore, the mineral oil is quite unfit for practical use. On the other hand, silicone oil, modified silicone oil and fluorine-containing oil have the thermal stability and good release action even at a high temperature, however, will form rubber-like sludges at a temperature of 200° C. or above or pile up successively to lose the effect thereof. The above-mentioned sludges will become tarry, and stain the surroundings remarkably or too great staining on the surfaces of products will often make the attainment of the object in improving the release properties of the metallic surfaces difficult. Futhermore, the often proposed salts of fatty acids will cause the danger of corrosion on the metallic surfaces due to the hydrolysis, dissociation and liberation of the fatty acids. For example, compounds such as esters of isethionic acid with fatty acids are regarded as good in the release properties at low temperature; however, it is difficult to keep the compounds stable and last the effect thereof. Corrosive action is increased due to the decomposition, and the formation and successive piling up of sludges cannot be easily avoided. Thus, it is possible to guess the importance of smooth continuous use without the continuous piling up of sludges on the metallic surfaces at 200° C. or above. The treatment of the metallic surfaces by coating the surfaces with Teflon ®, and baking the resulting Teflon ® coat to prevent the piling up or sticking of foreign substances is known in recent times; however, the treated surfaces are ordinarily used mainly at about 100° C. The surfaces treated with Teflon ® cannot be easily maintained as they are at 200° C. or above at all.

The Teflon ® coat has basic disadvantages as follows:

The abrasion resistance is very low, and scratches are readily formed on the surface. The coat is unfit for practical use at a temperature of 200° C. or above by any means.

BRIEF SUMMARY OF THE INVENTION

The object of this invention, therefore, is to provide a method for treating metallic surfaces not to form and pile up sludges resulting from the thermal decomposition in a certain amount or more and simultaneously modifying the surface properties of the sludges as such.

DESCRIPTION OF PREFERRED EMBODIMENTS OF THE INVENTION

[The First Aspect]

As a result of intensive research made on a method for treating metallic and ceramic surfaces without the aforementioned disadvantages in the practical use at 200° C. or above, the present inventors have noticed that the thermal decomposability regarded as the disadvantages of polyalkylene glycols or derivatives thereof is reversely used to modify the surface properties of sludges not to pile up the formed sludges in a given amount or more on the metallic surfaces, thus completing this invention.

Thus, this invention provides a method for treating metallic or ceramic surfaces kept at high temperatures, which comprises applying a lubricating composition comprising

[A] 50% by weight or more of a polyalkylene glycol or a derivative thereof thermally decomposable at 150° C. or above in air and

[B] 50% by weight or less of at least one fluorine-containing compound selected from the group consisting of
 (b-1) nonionic fluorine-containing compounds having a fluoroalkyl group of 3 to 20 carbon atoms in the molecule and a polyoxyalkylene chain,
 (b-2) compounds having a fluoroalkyl group of 3 to 20 carbon atoms and a residue of a carboxylic acid or salt thereof (with a metallic atom, ammonia or a nitrogen-containing amino compound capable of forming the salt with the carboxylic acid group) in the molecule,
 (b-3) compounds having a fluoroalkyl group of 3 to 20 carbon atoms and a residue of phosphoric acid or a salt thereof (with a metallic atom, ammonia or a nitrogen-containing amino compound capable of forming the salt with the phosphoric acid group) in the molecule,
 (b-4) compounds having a fluoroalkyl group of 3 to 20 carbon atoms and a residue of sulfonic acid or a salt thereof (with a metallic atom, ammonia or a nitrogen-containing amino compound capable of forming the salt with the sulfonic acid group) in the molecule,
 (b-5) compounds having a fluoroalkyl group of 3 to 20 carbon atoms and a cationic group containing a quaternary nitrogen atom in the molecule, and
 (b-6) compounds having a fluoroalkyl group of 3 to 20 carbon atoms and an amphoteric group in the molecule to the metallic or ceramic surfaces kept at 200° C. or above, and treating the metallic or ceramic surfaces while thermally decomposing the component [A] positively on the metallic or ceramic surfaces and converting the lubricating composition into a slightly sticking and piling up sludge consisting of a complex of the formed decomposition product with the component [B].

For further details, in this invention, the formed sludge is converted in the presence of the fluorine-containing compound into a special complex consisting of the sludge and the fluorine-containing compound, that is, a complex having the property of slight sticking to the metallic surfaces at 200° C. or above or further not piling up in a given amount or more though the thermal decomposition of the polyalkylene glycol is positively permitted. Thus, the metallic surfaces can be protected without disadvantages in practical use, and the fluoroalkyl group is included in the sludges formed as the decomposition product of the polyalkylene glycol to modify the surface properties of the sludges as such and prevent the growth and piling up of the sludges and corrosiveness of the metallic surfaces at high temperatures.

The polyalkylene glycol or the derivative thereof {component [A]}, used in this invention, and thermally decomposable at 150° C. or above in air is already publicly known, and specifically polyethylene glycol, polypropylene glycol or random or block copolymer of ethylene oxide with propylene oxide. One or both ends of the polyalkylene glycol, of course, may be alkyl groups and the like linked through ether, ester, thioether aminoether and the like. This invention will not be limited by the kinds of the terminal groups at all. Thus, the polyalkylene glycol is a polyether, obtained by polymerizing ethylene oxide or propylene oxide or further copolymerizing ethylene oxide with propylene oxide by the well-known method, having a molecular weight of 1000 to 15000, and is usually prepared readily by using a compound having at least active hydrogen atom reactive with alkylene oxides as the terminal groups. For details, mono-∼ polyhydric alcohols may be cited as the compound for forming hydroxyl groups as the terminal groups; mono-∼ polybasic acids, as the compound for forming carboxyl groups as the terminal groups. Mono-∼ polyfunctional amino compounds may be cited as the compound for forming amino groups as the terminal groups. In this invention, the terminal groups, the copolymerization ratio between propylene oxide and ethylene oxide and the like are not particularly limited; however, copolymers having a higher copolymerization ratio of propylene oxide are preferred for this invention. The content of the polyalkylene glycol or derivative thereof in the total lubricating composition is 50% by weight or more, preferably 70% by weight or more, to obtain the effects of this invention. If the content is less than 50% by weight, the amount of sludges as such is uselessly increased too much, or smoking or tarry substances are increased at a temperature of 200° C. or above depending on the kinds of the polyalkylene glycol or the derivative thereof. Thus, the metallic or ceramic surfaces are greatly stained to cause the disadvantages of serious staining on the surroundings or products as such. Therefore, a composition forming only a minimal amount of sludges even by the thermal decomposition at 200° C. or above is particularly preferred for this invention. A polyalkylene glycol or a derivative, comprising 70% by weight or more of a polyether with a high polymerization ratio of propylene oxide therein, and forming 5% by weight or less of sludges at a temperature of 200° C. or above is preferably used for giving particularly improved effects of this invention.

The component [B] to be added to the lubricating composition as an essential component of this invention will be described hereinafter.

Component (b-1):

Nonionic fluorine-containing compounds used in this invention refer to as nonionic fluorine-containing compounds having at least one fluoroalkyl group of 3 to 20 carbon atoms, preferably of 6∼10 carbon atoms, in the molecule, and further a polyoxyalkylene chain. More specifically, the compounds are adducts of alkylene oxides of the general formula (1)

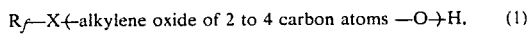

$$R_f-X-(\text{alkylene oxide of 2 to 4 carbon atoms} -O-)_n H. \quad (1)$$

obtained by adding alkylene oxides to perfluoroalkyl compounds having active hydrogen atoms. Ethylene oxide, propylene oxide, butylene oxide and the like are used as the alkylene oxides, and ethylene oxide and propylene oxide are preferably use. On the other hand, the corresponding fluorine-containing compounds can be obtained by polymerizing hexafluoroethylene and the like in polyethylene glycol, polypropylene glycol, polybutylene glycol or further a copolymer thereof without the addition of the alkylene oxides.

More specifically, the nonionic fluorine-containing compounds will be described hereinafter; however, these compounds are only specifically illustrated without limiting this invention at all.

Examples of the nonionic fluorine-containing compounds include compounds of the general formulas (2), (3), (4) and (5)

     (2)

     (3)

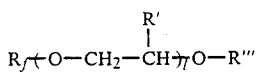     (4)

wherein $R_f$ represents a fluoroalkyl group of 3 to 20 carbon atoms; R' represents hydrogen atom or methyl group; X represents

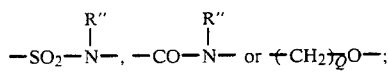

R'' represents
hydrogen atom or an alkylene group of 1 to 8 carbon atoms; Q represents an integer 1 to 4; l represents an integer of 1 or larger; R''' represents an alkyl group of one or more carbon atoms and

     (5)

wherein $R_f$ represents a fluoroalkyl group of 3 to 20 carbon atoms; Y represents

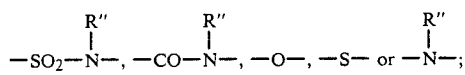

Z represents —COO—, —O— or —S—, R' and R'' are the same as the general formula R' R''; the aromatic nucleus represents benzene nucleus, naphthalene nucleus or diphenyl nucleus; l represents an integer 1 or larger. Nonionic fluorine-containing compounds having
the general formulas (1) to (5) are as follows:
(a) If R' is hydrogen atom in the formula

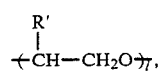

the compounds are oxyethylene derivatives represented by the well-known nonionic surfactants containing a polyoxyethylene chain and a fluoroalkyl group;

(b) If R' is methyl group in the above-mentioned formula in (a), the compounds are oxypropylene derivatives represented by the well-known nonionic surfactants containing a polyoxypropylene chain and a fluoroalkyl group; and (c) If R's are hydrogen atoms and methyl groups in the above-mentioned formula in (a), the compounds are nonionic compounds having both oxyethylene groups and oxypropylene groups, more specifically block or random type polyoxyalkylene compounds expressed by the structure having the terminal fluoroalkyl group.

More specific examples of the compounds as such, wherein EO and PO mean ethylene oxide and propylene oxide respectively and the numbers of added moles thereof are shown in parentheses, include N-polyoxyethylene (EO=10)-N-propylfluorooctanesulfonamide, N-polyoxyethylene (EO=7)-N-ethylperfluorooctanecarboxamide, N-polyoxyoxyalkylene (co-polymerization ratio PO/EO=70/30 by weight, molecular weight: 2500)-N-propylperfluorooctanesulfonamide, polyoxyethylene (EO=15) perfluorononenyl ether, 2-perfluoroheptyl-2-hydroxypropyl polyoxyethylene (EO=15) ether, a reaction product of nonylphenoxypolyethylene glycol (E=20) with dimer and trimer of fluorinated propylene, 2-polyoxyethylene (EO=10)-3-perfluorononenylpropyldiethylamine and the like. Therefore, nonionic fluorine-containing compounds having a fluoroalkyl group so rich in variety as to be too numerous to mention can be obtained by using propylene oxide, ethylene oxide and the like. Compounds having a fluoroalkyl group or groups introduced into one or both ends of the molecule are obtained depending on the process for preparing the same.

Thus, compounds having the fluoroalkyl group and polyoxyalkylene chain are usually prepared by the well-known processes.

Component (b-2):
Examples of compounds having at least one fluoroalkyl group and at least one carboxylic acid residue include salts of carboxylic acids having at least one perfluoroalkyl group of 3 to 20 carbon atoms, more preferably 8 to 10 carbon atoms, i.e. carboxylic acids having at least one fluoroalkyl group expressed by the general formulas (6) and (7)

     (6)

and

     (7)

wherein $R_f$ represents a fluoroalkyl group of 3 to 20 carbon atoms; Q represents

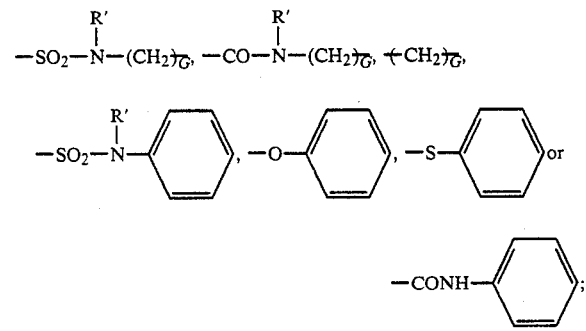

G represents an integer 1 to 10; R' represents hydrogen atom, methyl, ethyl, propyl or butyl group) and salts thereof.

However, those described above illustrate only a part of specific examples, and the benzene nucleus, of course, may be replaced by naphthalene nucleus or diphenyl nucleus in the general formula (7). Examples of salts of compounds expressed by the general formulas (6) and (7) include salts of the compounds with various mono-~ multivalent metallic atoms, ammonia, mono-, di- or trialkanolamines, mono-, di- or trialkylamins having lower alkyl groups and further long-chain alkylamines capable of forming the salts of the carboxylic acids as already mentioned in the sulfonic acid of component (b-4). Usually, salts of multivalent metal can be readily obtained generally as water-insoluble salts by forming the salts of the carboxylic acids or substituting the monovalent metallic atom in the salts of carboxylic acids with the corresponding metallic atom. Specific examples of the compounds as such include ammonium perfluorooctanoate, triethanolamine salt of perfluorooctanoic acid, potassium salt of perfluoroalkyl ($C_8$) N-ethylsulfonylglycine, potassium salt of perfluoroalkyl ($C_8$) N-propylsulfonylglycine, sodium perfluoroalkyl ($C_{10}$) carboxylate, calcium perfluorooctanoate, sodium perfluoroalkyl ($C_9$) oxybenzenecarboxylate, disodium N-perfluorooctanesulfonylglutamate, potassium perfluorononenylthiobenzenecarboxylate, and the like. However, the compounds are not limited thereto at all.

Component (b-3):

Specific preferred examples of compounds having a fluoroalkyl group of 3 to 20 carbon atoms and phosphoric acid or a salts thereof (with a metallic atom, ammonia or a nitrogen-containing amino compound capable of forming the salts with the phosphoric acid group) in the molecule include perfluoroalkylphosphoric acids of 3 to 20 carbon atoms or salts thereof, more preferably perfluoroalkylphosphates of 8 to 10 carbon atoms on salts thereof.

Phosphoric esters containing a fluoroalkyl group or groups expressed by the general formula (8)

$$(R_fX)_kPO(OH)_{3-k} \qquad (8)$$

wherein $R_f$ represents a fluoroalkyl group of 3 to 20 carbon atoms; X represents

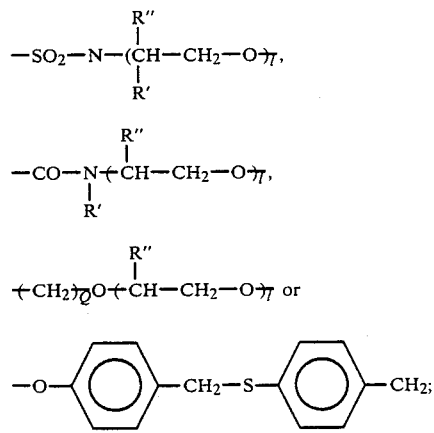

k represents an integer 1 to 2; R' represents hydrogen atom or an alkylene group of 1 to 8 carbon atoms; R" represents hydrogen atom or methyl group; l represents an integer 1 or larger; Q represents an integer 1 to 4, or salts thereof.

Examples of M (salts) in the general formula (8) include metallic atoms, ammonia, and ethanolamines such as monoethanolamine, diethanolamine, triethanolamine and the like or propanolamine and well-known lower mono-, di- or trialkylamines such as methylamine, ethylamine, propylamine, dimethylamine, triethylamine and the like and further long-chain alkylamines capable of forming salts with phosphoric esters.

Examples of metallic atoms capable of forming salts with phosphoric esters include mono~ multivalent metals such as lithium, sodium, potassium, cesium, rubidium, magnesium, calcium, aluminum, scandium, titanium, chromium, manganese, cobalt, nickel, copper, zinc, zirconium, indium, tin, barium, lead, antimony and the like, and preferably metals capable of forming salts of white or colorless compounds, i.e. alkali metals such as lithium, sodium, potassium and the like, metals of Group II such as magnesium, calcium, zinc, barium, and the like, metals of Group III such as aluminum, scandium and the like, metals of Group IV represented by tin, metals of Groups V and VI such as bismuth, selenium and the like.

Particularly preferred among them are monovalent alkali metallic salts soluble in water and suitably used. Salts thereof can be synthesized usually by using soluble salts of metals corresponding to alkali metallic salts of phosphoric esters. Most of di- or multivalent metallic salts are obtained as water-insoluble compounds, and water-insoluble salts are finely dispersed in a polyalkylene glycol for use.

Several more specific examples of compounds include monoperfluoroalkyl ($C_6 \sim C_{12}$) ethylphophates or salts thereof, 2-perfluoroalkyl ($C_9 \sim C_{20}$)-1-methyl-ethyl phosphates or salts thereof, phosphoric esters of 3-perfluoroalkyl($C_7 \sim C_{23}$)1,2-propanediols or salts thereof, $\alpha,\alpha$-$\omega$-trihydroperfluoroalkyl ($C_7$) phosphates or salts thereof, bis-(N-perfluorooctylsulfonyl-+-N-ethyl-aminoethyl) phosphate or salts thereof, phosphoric esters of mono-or di(2-perfluoroalkyl($C_4 \sim C_{16}$)ethylpolyoxyalkylene($C_2 \sim C_3$) ether and salts thereof, dipotassium salt, disodium salt, diammonium salt and diethanolamine salt of mono-(N-perfluorooctylsulfonyl-N-ethyl-aminoethyl) phosphate, and phosphoric esters of perfluorononenyl-ethyl-polyoxyalkylene (random or block copolymer of 2 moles of propylene oxide with 5 moles of ethylene oxide) ether or potassium salts thereof, phosphoric esters of 2-perfluorodecaneethyl-polyoxypropylene(PO=2)ether or salts thereof, phosphates of 2-perfluorodecane-1-methyl-ethylpolyoxyethylene(EO=2)ether or potassium salts thereof, potassium perfluorononenylthiobenzylphosphonate, sodium perfluorononenyloxybenzylphosphonate, potassium salts of perfluorononenylphenoxy-polyoxyethylene (EO=4) ether phosphates, sodium salt of N-hydroxyethyl-N-methyl-perfluorononenylthiobenzenesulfonamide monophosphate, bis-(perfluorononenyloxy)benzylphosphonic acid or sodium salt thereof and the like.

Most of such phosphate compounds are obtained easily by reacting alcoholic compounds having terminal hydroxyl groups with phosphorus pentoxide depending on the synthetic process, and in most cases in a mixture of monoalkyl substituted with dialkyl substituted phosphoric esters. Therefore, two phosphate radicals remain in the monoalkyl substituted esters, and a mixture of dipotassium with disodium salts is obtained in the case of alkali metals. In any cases, the effects of this invention will not be weakened.

Although not easily expressed by the general formula, metallic salts of phosphoric acid in the phosphoric ester salts are obtained as in the well-known phosphates particularly in case bi-~ multivalent metals are used for the metallic salts. For example, in the case of calcium, magnesium, aluminum, zinc, tin, barium, titanium, lead, iron, nickel and cobalt, the corresponding metallic salts of phosphoric acid are obtained. Phosphoric ester salts obtained from usually bi-~ multivalent metallic salts are mostly soluble in water, and used in the form of a fine dispersion. Salts per se are colored as in the case of iron, cobalt, nickel and chromium depending on the kinds of the multivalent metals. In some uses, alkali metallic salts usually obtained as colorless or white salts or calcium, magnesium and zinc obtained as colorless or white salts are selectively used though the effects of this invention will not be essentially reduced.

Component (B-4):

Specific examples of compounds having a fluoroalkyl group of 3 to 20 carbon atoms in the molecule and a residue of sulfonic acid or a salt thereof (with a metallic atom, ammonia or a nitrogen-containing or amino compound capable of forming the salt with the sulfonic acid groups or carboxylic acid group) include perfluoroalkylsulfonic acids of 3 to 20 carbon atoms or salts thereof or preferably perfluoroalkylsulfonic acid of 8 to 10 carbon atoms or salts thereof. Specific examples of such compounds are sulfonates, containing a fluoroalkyl group, and expressed by the general formulas (9), (10) and (11)

  (9)

  (10)

  (11)

wherein $R_f$ represents a fluoroalkyl group of 3 to 20 carbon atoms; X represents —S— or —O—; Y represents $-(CH_2)_m-$, benzene nucleus, naphthalene nucleus or diphenyl nucleus; n represents an integer 1 to 10; m represents an integer 1 to 3; Z represents

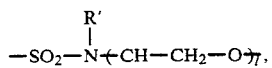

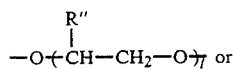

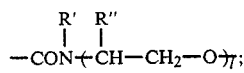

R' represents hydrogen atom, methyl, ethyl, propyl or butyl group; R" represents hydrogen atom or methyl group; l represents an integer 1 to 20). As salts, there may be cited salts with metallic atoms, ammonia, and further ethanolamines such as monoethanolamine, diethanolamine, triethanolamine and the like, or propanolamines, and the well-known lower mono-, di- or trialkylamines such as methylamine, ethylamine, propylamine, dimethylamine, triethylamine and the like, and further long-chain alkylamines and the like capable of forming the salts as sulfonates respectively.

Examples of metallic atoms capable of forming salts with sulfonic acid include mono-~ multivalent metals such as lithium, sodium, potassium, cesium, rabidium, magnesium, calcium, aluminum, scandium, titanium, chromium, manganese, cobalt, nickel, copper, zinc, zirconium, indium, lead, barium, tin, antimony and the like; however, alkali metals such as lithium, sodium, potassium and the like, metals of Group II such as zinc, barium and the like, metals of Group III such as aluminum, scandium and the like, metals of Goup IV represented by tin, metals of Groups V to VI such as bismuth, selenium and the like generally capable of forming salts white or colorless compounds respectively. Particularly preferred water-soluble monovalent alkali metallic salts are suitably used.

Usually, these salts can be synthesized by using soluble salts of metals corresponding to the sulfonic acid or alkali metallic salts thereof, and bi- or multivalent metallic salts are mostly obtained as water-insoluble compounds, which are finely dispersed in a polyalkylene glycol for use.

Several more specific examples of the compounds include sodium perfluorohexenyloxybenzenesulfonate, sodium perfluoroalkyl($C_9$)oxybenzenesulfonate, potassium perfluoroalkenyl($C_9$)oxybenzenesulfonate, potassium perfluorooctanesulfonate, sodium perfluoroheptanesulfonate, potassium perfluorooctanesulfonamide-benzylsulfonate, potassium perfluorooctanesulfonamidipropanesulfonate, potassium bis(perfluorononenyloxy)benzenesulfonate, potassium perfluorononenyloxynaphthalenesulfonate, potassium perfluorononenyloxydiphenylsulfonate, sodium 2,5-bis(-perfluorohexenyloxy)benzenesulfonate, potassium tris(-perfluoropropenyloxy)benzenesulfonate and potassium perfluorononenylthiobenzenesulfonate. As bi- or multivalent metallic salts, calcium perfluorooctanesulfonate, zinc perfluorooctanesulfonate, aluminum perfluorooctanesulfonate and the like may be cited. On the other hand, diethanolamine salt of perfluorooctanesulfonic acid, amine or potassium salts of perfluoroalkyl ($C_8$)ethyloxyethylene (EO=3) sulfates, may be cited as amine salts. However, the compounds, of course, are not limited thereto.

Component (b-5):

At least one compound having a fluoroalkyl group of 3 to 20 carbon atoms and a cationic group having a quaternary nitrogen atom is added to the lubricating composition for use, and specific examples of the compound include compounds containing a cationic group such as N-[3-(perfluorooctylamide)-propyl]N,N,N-trimethylammonium chloride, N-[3-(perfluorooctylsulfonamide)-propyl]N,N,N-trimethylammonium chloride, N-[3-(perfluorooctanesulfonamide)-propyl]N,N,N-trimethylammonium iodide, N-propyl-perfluorooctanesulfonamide-N-propylsulfonyl-N',N'-dimethyl N'-hydroxyethylammonium bromide and the like having a perfluoroalkyl group of 3~20 carbon atoms. However, compounds are not limited thereto at all, and all the cationic surfactants having a fluoroalkyl group of 3 to 20 carbon atoms in place of ordinary alkyl groups in the surfactant skeleton having a cationic group having the well-known alkyl group are effectively used in this invention.

Component (B-6):

Examples of amphoteric compounds include ammonium betaine of N-[3-(perfluoroalkyl($C_6$~$C_{12}$) amide)-propyl]N,N-dimethyl-N-α-carboxylic acid, N-[3-(perfluorooctanesulfonamide)propyl]-N,N-dimethyl-N-carboxymethylammonium betaine and the like as in the cationic surfactants.

The amount of the above-mentioned fluorine-containing compounds (b-1)~(b-6) blended into the lubricating composition is 50% by weight or less, preferably within the range of 15% by weight or less to 0.01% by weight. However, about 0.1 to 5.0% by weight is useful from the viewpoint of cost and effects. Most of such compounds having a fluoroalkyl group are readily soluble in water, and compounds readily soluble in water as an aqueous solution may be mixed with a polyalkylene glycol or a derivative thereof according to the purpose of use, or dispersed in the polyalkylene glycol or derivative thereof in case water is not usable as a dispersion medium.

It is a surprising fact that the addition of the well-known ionic compound to a lubricating composition containing the nonionic fluorine-containing compound (b-1) in the group of the aforementioned fluorine containing compounds further improves the effects thereof.

Thus, the well-known salts of aliphatic monocarboxylic acids and aliphatic dicarboxylic acids, more specifically fatty acid soap and the like may be cited as the ionic compounds having one or more carboxyl groups in the molecule to be used together with the nonionic fluorine-containing compound. In this case, of course, salts of fatty acids containing the fluoroalkyl group may be used. Examples of the ionic compound having at least one sulfonate group in the molecule include the well-known dialkyl sulfosuccinates, alkyl or alkanesulfonates, hydroxyalkanesulfonates, sulfonates of alkylbenzenes, alkylnaphthalenes, alkyldiphenyls, alkyldiphenyl ethers and the like, alkylphenoxypolyoxyethylenepropylsulfonates, polyoxyethylene-alkyl-sulfophenyl ether salts, N-methyl-N-oleyltaurine salts, monoamide salts of N-alkylsulfosuccinic acid, petroleum sulfonates, sulfonated castor oil sulfonated beef tallow oil, sulfuric ester of fatty acid alkyl esters, sulfuric ester salts of polyoxyethylene alkyl ethers, sulfuric ester salts of fatty acid monoglycerides, sulfuric ester salts of polyoxyethylene alkyl phenyl ethers, sulfuric ester salts of polyoxyethylene styryl phenyl ether and further perfluoroalkylsulfonates, and perfluoroalkyl sulfuric ester salts. Examples of compounds containing at least one phosphate group include alkyl phosphoric ester salts, polyoxyethylene alkyl ether phosphoric ester salts, polyoxyehtylene alkyl phenyl ether phosphoric ester salts and perfluoroalkyl phosphoric ester salts and the like. However, the compounds are not limited thereto. The salts are alkali metallic, salts such as Na, K or Li, ammonium salts, organic amine salts and the like. Furthermore, examples of such compounds having a cationic group include alkylamine salts, dialkylamine salts, tetraalkylammonium salts, trialkylammonium salts, alkylpyridinium salts, 2-alkyl-1-alkyl-1-hydroxyethylimidazolinium salts, N,N-dialkylmorpholinium salts, polyethylene polyamine fatty acid amide salts and the like. Examples of cationic fluorine-containing surfactants having a fluoroalkyl group or amphoteric group include N,N-dimethyl-N-alkyl-N-carboxyalkyleneammonium betaine, salts of N,N-dialkylaminoalkylenecarboxylic acids, N,N,N-trialkyl N-sulfoalkyleneammonium betaine, N-alkyl-N,N-bispolyoxyethylene sulfuric ester salts, 2-alkyl-1-hydroxyethyl-1-carboxymethylimidazolium salts, and further amphoteric fluorine-containing surfactants and the like expressed by the similar structure and the like. However, the ionic compounds are not limited thereto at all.

The use of the well-known ionic surfactants in a small amount together with the nonionic fluorine-comtaining compound of this invention remarkably improves the effects of this invention more than in the case of only the nonionic fluorine-containing compound which is the main component of this invention, and the amount of the nonionic fluorine-containing compound may be substantially reduced.

The amount of the above-mentioned nonionic compound to be used together with the nonionic fluorine-containing compound in this invention is 0.1% by weight or more and enough if in such a range as not to exceed the amount of the fluorine-containing compound.

The nonionic fluorine-containing compound of this invention and ionic surfactant readily soluble in water as an aqueous solution in water as a dispersion medium may be blended with a polyalkylene glycol or a derivative thereof. In case water cannot be used as the dispersion medium, they may be finely dispersed in the polyalkylene glycol or the derivative thereof.

The metallic or ceramic surfaces to be the object of the treatment in this invention are always heated and kept at 200° C. or above, and the effectiveness of the method at a far higher temperature than 150° C. is unprecedented compared to the case where a temperature below 150° C. is often used. Organic substances stuck to metallic or ceramic surfaces kept at a high temperature of 200° C. or above are usually decomposed thermally to form tar or leave studgy substances with the lapse of time. Therefore, the following disadvantages are caused:

Serious staining on the surfaces makes the continuous operation impossible, and cleaning should be continuously repeated.

Specific examples of the surfaces to be kept at 200° C. or above include surfaces of materials consisting of stainless steel or having ceramic surfaces formed by chromium plating or flame spray coating of alumina or the like such as specifically hot plates or hot rollers which are contact type heat-treating devices kept at 200° C. or above. In this case, it is well known that the following disadvantages are caused: Stains are scorched and stuck to the surfaces of hot plates or hot rollers and should be continuously cleaned. In effect, a large amount of sludges is formed on the metallic surfaces and the release properties is markedly deteriorated or the corrosion of a metallic mold is remarkably increased due to the thermal decomposition of the release agent even if a plastic is molded at a temperature of 200° C. or above. Therefore, the plastic cannot be molded at a high temperature of 200° C. or above.

The forming mechanism of sludges exhibiting the slight sticking to the metallic surfaces is as follows:

The metallic or ceramic surfaces heated at 200° C. or above are continuously or intermittently treated with the lubricating composition comprising a polyalkylene glycol or a derivative thereof easily decomposable at high temperatures thermally as a main component and at least one fluorine-containing compound having a fluoroalkyl group, to produce the effects of this invention. The polyalkylene glycol or the derivative thereof will be thermally decomposed and oxidized to form brown sludgy substances on hot plates at 200° C. or above in air in a short time. It is of great interest that the infrared analysis of the sludges shows the remarkable formation of carbonyl groups. The properties of sludges formed by the uniform treatment of the metallic surfaces and the thermal decomposition of the sludges are modified only under such conditions as to produce such carbonyl groups and not further grow the sludges. The treatment can be carried out from both the metallic and the sludge surfaces. The great feature of the treatment is that the effects of this invention cannot be achieved under such conditions as not to cause the positive thermal decomposition of the polyalkylene glycol.

In other words, the surface properties of the tar or sludges cannot be modified by treating the metallic surfaces at low temperatures, and the lubricating composition used in this invention will not function properly at low temperatures. The structure of the oxidation product containing the carbonyl groups formed by the thermal decomposition is quite unknown by the measurement of the acid value; however, the formation of organic acids is assumed. (There is a remarkable change in infrared absorption at a wave number of 1735 cm$^{-1}$, i.e. no absorption to a large absorption before to after the sludge formation.)

It is a quite unknown mechanism that the metallic surfaces continuously kept at 200° C. or above and sludge surfaces are simultaneously treated with a complicated complex of the oxidation product formed by the thermal decomposition with the oxidation product of alkylene oxides containing a relatively thermally stable fluoroalkyl group to convert the sludges into a temporarily sticking substance.

In accordance with the object of this invention, the lubricating composition comprises 50% by weight or more of a polyalkylene glycol or a derivative thereof as a main component and at least one fluorine-containing compound or further at least one well-known ionic surfactant as an essential component. However, the well-known lubricants, specifically mineral oil, alkyl esters, alkyl thioesters, alkyl ethers, alkyl thioethers, waxes, silicones, fluorine compounds and further well-known cationic surfactants, ampholytic surfactants, anionic surfactants and further low-molecular weight nonionic surfactants may be added to the blend as far as the effects of this invention are not inhibited. In addition, a small amount of dyes, pigments, talc, mica, aluminum, or further sizes, synthetic emulsions and the like may be added thereto if necessary for some purposes.

The lubricating composition may be applied to the metallic or ceramic surfaces continuously kept at 200° C. or above by the well-known methods to obtain the effects of this invention as follows:

The surface treatment can be carried out by transferring lubricating composition in portions to the surfaces of hot rollers or hot plates, or spraying, brushing or applying the composition intermittently with a fabric impregnated with the lubricating composition to the surfaces for the direct treatment.

This invention will not be limited by the methods at all.

Furthermore, four model test methods were used for explaining the effects of this invention in detail of this invention in detail and adapting to the practical conditions.

Model test method (1):

After allowing 2 g of a sample in a stainless steel dish (diameter: 5 cm, depth: 8 cm) to stand in a hot-air dryer at 230° C. for 24 hours, the stainless steel dish was taken out and cooled. The formed sludge was lightly and gently wiped off with a gauze to observe the surface conditions of the stainless steel and determine the releasability of the sludge by measuring the weight. The fresh sample was further introduced into the dish, and the same procedures were repeated two, three and four times to make the experiment. The conditions of piled up sludge were evaluated and classified into 5 ratings O~X.

Model test method (2):

A new dish, having a ceramic surface, and prepared by the flame spray coating of alumina on a stainless steel dish was used in place of the stainless steel dish used in Model test method (1), and the conditions of piled up sludge were evaluated in the same manner as in Model test method (1).

Model test method (3):

A new dish plated with chromium was used in place of the stainless steel dish employed in Model test method (1), and evaluation was made in the same manner as in Model test method (1).

Model test method (4):

The sludge obtained by the method of this invention was referred to as (sludge-A), and the sludge obtained by the methods other than the method of this invention was referred to as (sludge-B). These sludges were previously pulverized into the block or granular form. These sludges were thoroughly mixed to give a ratio between the random copolymer (molecular weight:3500) of a butanol-terminated polyalkylene glycol (copolymerization ration PO/EO=50/50 by weight) and the sludge of about 50:1. The change in properties of the mixed sludge as such was evaluated by using a new stainless steel dish according to Model test method (1) for the following cases:

Mixture of the sludge according to this invention and a mixture of a sludge other than this invention.

The evaluation was carried out in the 5 ratings of O, O−Δ, Δ, Δ−X and X as follows:

| 1. | O   | Almost no further sticking of sludge |
|----|-----|--------------------------------------|
| 2. | O−Δ |                                      |
| 3. | Δ   | Slight sticking of sludge            |
| 4. | Δ−X |                                      |
| 5. | X   | Further sticking of sludge.          |

This invention will be illustrated by the following examples wherein parts and % represent parts by weight and % by weight respectively.

EXAMPLE 1 AND COMPARATIVE EXAMPLE 1

With 90 parts of a random copolymer (molecular weight:3500) of a butanol-terminated polyalkylene glycol (copolymerization ratio PO/EO=75/25 by weight), were mixed 10 parts each of N-polyoxyethylene (EO=10)-N-propylperfluorooctanesulfonamide (Run No.1), N-polyoxyethylene (EO=7)-N-ethylperfluorooctanecarboxamide (Run No.2), N-polyoxyalkylene (PO/EO=70/30 by weight, molecular weight:2500)-N-propylperfluorooctanesulfonamide (Run No.3), polyoxyethylene (EO=15) perfluorononenyl ether (Run No.4), 2-perfluoroalkyl (C$_9$)2 hydroxypropylpolyoxyethylene ether (EO=15) (Run No.5), addition product of nonylphenoxypolyethylene glycol (EO=20) with trimer and dimer of fluorinated propylene (Run No.6) or 2-polyethylene (EO=10) 3-perfluoroalkyl (C$_9$) propyldiethylamine (Run No.7). Measurement was made according to Model test method (1). As Comparative example 1, tests were made according to Model test method (1) on 100% of the above-mentioned polyalkylene oxide copolymer(Run No.1′) and compositions of 90 parts of the aforementioned polyalkylene glycol and 10 parts each of the well-known nonionic surfactant, i.e. N-polyoxyethylene (EO=10)-N-propyloctanesulfonamide (Run No.2′), N-polyoxyethylene (EO=7)-N-ethylcarboxamide (Run No.3′) or N-polyoxyalkylene (copolymerization ratio PO- /EO=70/30 by weight, molecular weight:2500)-N-propyloclanesulfonamide (Run No.4'). Results are summarized in Table 1 based on Comparative example 1 as a standard.

TABLE 1

|  | The first Measurement | The second measurement | Conditions of piled up sludge |
|---|---|---|---|
| This invention |  |  |  |
| Run No. 1 | O | O | O |
| Run No. 2 | O | O | O |
| Run No. 3 | O-Δ | O | O |
| Run No. 4 | O-Δ | O-Δ | O-Δ |
| Run No. 5 | O-Δ | O-Δ | O |
| Run No. 6 | O-Δ | O-Δ | O-Δ |
| Run No. 7 | O-Δ | O | O |
| Comparative example 1 |  |  |  |
| Run No. 1' | X | X | X |
| Run No. 2' | X | X | X |
| Run No. 3' | X | X | X |
| Run No. 4' | X | X | X |

As can be seen from the results, the piling up of sludge is scarcely recognized in the method of this invention, whereas the piling up of sludges on the metallic surfaces was remarkable wholly in Comparative example 1.

EXAMPLE 2

Samples of Run Nos. 1~7 in Example 1 and Run Nos. 1'~4' in Comparative example 1 were evaluated by Model test methods (2) and (3), and the results obtained showed the same tendency as those in Table 1 obtained by Model method test (1).

EXAMPLE 3 AND COMPARATIVE EXAMPLE 2

To 90 parts of a random copolymer (molecular weight:3000) of a butanol-terminated polyalkylene glycol (copolymerization ratio PO/EO=65/35 by weight), were added 10 parts each of the following compound: the nonionic compound used in Run No.1 of Example 1 (Run No.1) or the nonionic fluorinecontaining compound used in Run No.3 of Example 1 (Run No.2). As Comparative example 2, the polyalkylene glycol alone (Run No.1') was used, and 10 parts of the nonionic compound used in Run No.2 of Comparative example 1 were added to 90 parts of the above-mentioned polyalkylene glycol (Run No.2'). The resulting samples were allowed to stand in a hot-air dryer at 230° C. for 24 hours to form sludges. Determination was made on the sludges obtained from Run No.1 of Example 3 (sludge—1), sludge obtained from Run No.2 of Example 3 (sludge—2), and those obtained from Run Nos. 1' and 2' of Comparative example 2 (sludge—3 and Sludge—4) by using a new stainless steel dish according to Model test method (4). The results obtained are summarized in Table 2.

TABLE 2

|  | Sludge No. | Observation of change in sludge |
|---|---|---|
| This invention |  |  |
| Run No. 1 | sludge - 1 | O |
| Run No. 2 | sludge - 2 | O |
| Comparative Example 2 |  |  |
| Run No. 1' | sludge - 3 | X |
| Run No. 2' | sludge - 4 | X |

The results show that the surfaces of the sludges as such obtained by the method of this invention were modified.

EXAMPLE 4 AND COMPARATIVE EXAMPLE 3

With 95 parts of a butanol-terminated polyoxyalkylene glycol (molecular weight:3500, copolymerization ration PO/EO=75/25 by weight), were mixed 4 parts of the nonionic fluorinecontaining compound used in Run No.1 of Example 1 and one part each of the following compound: potassium oleate (Run No.1), sodium laurylsulfonate (Run No.2), potassium salt of 2 mole adduct of oxyethylene with lauryl phosphate (Run No.3), sodium dioctylsuccinate (Run No.4), potassium perfluorooctanesulfonate (Run No.5), oleylmethylammonium ethosulfate (Run No.6) or N-octadecyl-oxymethyl-N,N-dimethylbetaine (Run No.7). The resulting samples were evaluated according to Model test method (1). For purposes of comparison, the following samples were evaluated: 100% of the above-mentioned polyalkylene oxide copolymer alone, (Run No.1') compositions of 95 parts of the aforementioned polyalkylene glycol with 4 parts of the nonionic compound used in Run No.2' of Comparative example 1 and one part each of the following compound: potassium oleate (Run No.2'), sodium lauryl sulfonate (Run No.3'), potassium salt of 2 moles adduct of oxyethylene with lauryl phosphate (Run No.4'), dioctyl sodium sulfosuccinate (Run No.5'), oleyltrimethylammonium ethosulfate (Run No.6') or N-octadecyl oxymethyl N,N-dimethylbetaine (Run No.7'). The results obtained are summarized in Table 3.

TABLE 3

| This invention | The first measurement | The second measurement | Condition of piled up sludge | Comparative example | The first measurement | The second measurement | Condition of piled up sludge |
|---|---|---|---|---|---|---|---|
| Run No. 1 | O | O | O | Run No. 1' | X | X | X |
| Run No. 2 | O | O | O | Run No. 2' | X | X | X |
| Run No. 3 | O | O | O | Run No. 3' | X | X | X |
| Run No. 4 | O | O | O | Run No. 4' | X | X | X |
| Run No. 5 | O | O | O | Run No. 5' | X | X | X |
| Run No. 6 | O | O | O | Run No. 6' | X | X | X |
| Run No. 7 | O | O | O | Run No. 7' | X | X | X |

EXAMPLE 5 AND COMPARATIVE EXAMPLE 4

Measurement was made of the respective compositions in Run No.1 of Example 4 and Run No.1' of Comparative example 3 according to the same method as in Example 3, i.e. Model test method (4). There is a very distinct difference between Example 5 and Comparative example 4, and the sludge was piled up remarkably in Comparative example 4.

EXAMPLE 6 AND COMPARATIVE EXAMPLE 5

To 98 parts of random copolymer (molecular weight:3500) of a butanol-terminated polyalkylene glycol (copolymerization ratio PO/EO=75/25 by weight), were added 2 parts of potassium phenoxysulfonate having a fluoroalkyl group of 9 carbon atoms, and the resulting sample was evaluated according to Model test method (1) (Run No.1'). Run Nos 1~6 of Example 6 and Run Nos. 1'~4' of Comparative example 5 were wholly evaluated according to Model test method (1).

The following compositions were used:

98 parts of the above-mentioned polyalkylene glycol and 2 parts each of potassium fluoroalkyl sulfonate of 8 carbon atoms (Run No.2) or potassium bis (perfluorononenyloxy)-benzensulfonate (Run No.3);

97 parts of the polyalkylene glycol and 3 parts of potassium phenoxycarboxylate having 9 carbon atoms (Run No.4);

97 parts by weight of the above-mentioned polyalkylene glycol and 3 parts of potassium salt of sulfonyl N-sarcosine having a fluoroalkyl group of 8 carbon atoms (Run No.5); and 98 parts of the above-mentioned polyalkylene glycol and 2 parts of potassium salt of N-[bis-per-fluorononenyloxy-benzenesulfonyl] sarcosine (Run No.6). For purposes of comparison, the following samples were used: 100% of the polyalkylene glycol (Run No.1');

98 parts of the polyalkylene glycol with 2 parts of potassium dodecylbenzenesulfonate (Run No.2');

98 parts of the polyalkylene glycol and 2 parts of potassium laurylsulfonate (Run No.3'); and 97 parts of the polyalkylene glycol and 3 parts of potassium nonylphenoxy acetate (Run No.4').

The resulting samples were evaluated by the same method as in Example 1. The results obtained are summarized in Table 4 on the basis of Comparative example 1.

TABLE 4

|  | The first measurement | The second measurement | Condition of piled up sludge |
|---|---|---|---|
| This invention |  |  |  |
| Run No. 1 | O | O | O |
| Run No. 2 | O~Δ | O | O |
| Run No. 3 | O | O | O |
| Run No. 4 | O | O | O |
| Run No. 5 | O~Δ | O | O |
| Run No. 6 | O | O | O |
| Comparative example 5 |  |  |  |
| Run No. 1' | X | X | X |
| Run No. 2' | X | X | X |
| Run No. 3' | X | X | X |
| Run No. 4' | X | X | X |

As can be seen from the results, the piling up of sludges was scarcely observed on the stainless steel surface by the treating method of this invention (Example 6). On the other hand, the piling up of sludges was remarkable wholly on the stainless steel surface in Comparative example 5 of the treating method other than this invention.

EXAMPLE 7

The respective samples of Example 6 and Comparative example 5 were evaluated by Model test methods (2) and (3), and there was the same tendency as the results in Model test method (1). It is found that the material of the metallic surface had no effect.

EXAMPLE 8 AND COMPARATIVE EXAMPLE 6

The following compositions were prepared as samples:

97 parts of a random copolymer (molecular weight:3000) of a butanol-terminated polyalkylene glycol (copolymerization ratio PO/EO=65/35 by weight) and 3 parts of a perfluoroalkylsulfonate having 8 carbon atoms (Run No.1) and 95 parts of the above-mentioned polyalkylene glycol and 5 parts of potassium phenoxycarboxylate having 8 carbon atoms (Run No.2). For purposes of comparison, the following samples are used: the polyalkylene glycol alone (Run No.1') and a composition of 95 parts of the above-mentioned polyalkylene glycol and 5 parts of potassium laurylsulfonate (Run No.2').

The resulting samples were subjected to the sludge formation in a hot-air dryer at 230° C. for 24 hours.

The sludges obtained from Run Nos.1 and 2 of this Example (sludge—1 and sludge—2) and the sludges obtained from Run Nos.1' and 2' of comparative example 6 (sludge—3 and sludge—4) were evaluated in a new stainless steel dish by Model test method (4). The results obtained are summarized in Table 5.

TABLE 5

|  | Sludge No. | Observation of change in sludge |
|---|---|---|
| This invention |  |  |
| Run No. 1 | sludge - 1 | O |
| Run No. 2 | sludge - 2 | O |
| Comparative example 6 |  |  |
| Run No. 1' | sludge - 3 | X |
| Run No. 2' | sludge - 4 | X |

The results show that the surfaces of the sludges obtained by the method of this invention were modified.

EXAMPLE 9 AND COMPARATIVE EXAMPLE 7

To 95 parts of a random copolymer (molecular weight:3500) of a butanol-terminated polyalkylene glycol (copolymerization ratio PO/EO=75/25 by weight), were added 5 parts of ammonium salt of bis-[(N-perfluorooctylsulfonyl)-N-ethyl-aminoethyl] phosphate, and the resulting sample was evaluated according to Model test method (1) (Run No.1). Samples of Run Nos. 2~4 and Run Nos. 1'~5' of Comparative example 7 were also evaluated according to Model test method (1).

Thus, the fluorine-containing compound used in Run No.1 was replaced by 5 parts of potassium salt of mono- and di-[2-perfluorooctyl-ethyl-polyoxyethylene (EO=5) ether]-phosphate (Run No.2), zinc bis-(perfluorononenyloxy)-benzylphosphonate (Run No.3), and potassium salt of N-hydroxyethyl-N-methylperfluorononenylthiobenzenesulfonamide monophosphate (Run No.4). For purposes of comparison, 100% of the above-mentioned polyalkylene glycol alone (Run No.1'), compositions 95 parts of the above-mentioned polyalkylene glycol and 5 parts each of the following compound: ammonium salt of bis-[(N-octylsulfonyl)-N-ethylaminoethyl]phosphate (Run No.2'), potassium salt of mono- and di-[-octyl-ethyl-polyoxyethylene (EO=5) ether-}-phosphate (Run No. 3'), zinc bis-(-nonenyloxy)benzylphosphonate (Run No.4') or potassium salt of N-hydroxyethyl-N-methyl-nonenyl-thiobenzenesulfonamide monophosphate (Run No.5'). The samples were evaluated by the same method as in Example 9. The results obtained are summarized in Table 6 on the basis of Run No.1' in Comparative example 7 as a standard.

TABLE 6

| Item | The first measurement | The second measurement | Condition of piled up sludge |
|---|---|---|---|
| This invention | | | |
| Run No. 1 | O~△ | O | O |
| Run No. 2 | O | O | O |
| Run No. 3 | O | O | O |
| Run No. 4 | O~△ | O~△ | O~△ |
| Comparative example 7 | | | |
| Run No. 1' | X | X | X |
| Run No. 2' | X | X | X |
| Run No. 3' | X | X | X |
| Run No. 4' | X | X | X |
| Run No. 5' | X | X | X |

As is evident from Table 6, the piling up of sludge was scarcely observed on the stainless steel surface in Run Nos. 1~4 of Example 9 by the treating method of this invention. In contrast to this, the material of the stainless steel surface had no effect on the piling up of sludges in Run Nos. 1'~5' of Comparative example 7.

EXAMPLE 10 AND COMPARATIVE EXAMPLE 8

The following samples were evaluated respectively to form sludges in a hot-air dryer at 230° C. for 24 hours: compositions of 94 parts of a random copolymer (molecular weight:3000) of a butanol-terminated polyalkylene glycol (copolymerization ratio PO/EO=65/35 we weight) and 6 parts each of the following compound: potassium salt of 2-perfluorooctyl-1-methyl-ethyl phosphate (Run No.6), potassium salt of per-fluorononenylethyl-polyoxyalkylene (random copolymer of 2 moles of PO with 5 moles of EO) ether phosphate (Run No.7), potassium salt of 2-octyl-1-methyl-ethylphosphate (Run No.1' of Comparative example 8) or potassium salt of nonenyl-ethyl-polyoxyalkylene (random copolymer of 2 mols of PO with 5 moles of EO) ether phosphate (Run No.2' of Comparative example 8).

Sludges from Run Nos. 1 and 2 of Example 10 (sludge—1 and sludge—2) and sludges from Run Nos. 1' and 2' of Comparative example 8 (sludge—3 and sludge—4) were determined in a new stainless steel dish by Model test method (4). The results obtained are summarized in Table 7.

TABLE 7

| | Sluged No. | Observation of change in sludge |
|---|---|---|
| This invention | | |
| Run No. 1 | Sludge - 1 | O |
| Run No. 2 | Sludge - 2 | O |
| Comparative example 8 | | |
| Run No. 1' | Sludge - 3 | X |

TABLE 7-continued

| | Sluged No. | Observation of change in sludge |
|---|---|---|
| Run No. 2' | Sludge - 4 | X |

The results show that the surfaces of the sludges obtained by the method of this invention were modified.

EXAMPLE 11 AND COMPARATIVE EXAMPLE 9

To 95 parts of a random copolymer (molecular weight:3500) of a butanol-terminated polyalkylene glycol (copolymerization ratio PO/EO=75/25 by weight), were added to parts of N-[(-perfluorooc-tanoylamide-}-propyl] N,N,N-trimethylammonium chloride. The resulting sample was evaluated according to Model test method (1) (Run No.1). Samples of Run Nos. 2~4 in Example 11 and Run Nos. 1~9 in Comparative example 9 were also evaluated according to Model test method (1). The cationic fluorine-containing compound used in Run No.1 of Example 11 was replaced by N-[3-(-perfluorooctanesulfonamide)-propyl] N,N,N-trimethylammonium iodide (Run No.2), N-pro-pyl-perfluoro-octylsulfonamide-propylsulfonyl-N', N'-dimethyl-N'-hydroxyethylammonium chloride (Run No.3) and N-[3-perflurorooctanoylamide)-propyl] N,N-dimethyl-N-carboxymethylammonium betaine (Run No.4). For purposes of comparison, the following samples were evaluated by the same method as in Example 1:

100% of the above-mentioned polyalkylene glycol (Run No.1'), compositions of 95 parts of the above-mentioned polyaklylene glycol and 5 parts each of the compound as follows:

N-[3-octanoylamide-propyl] N,N,N-trimethylammonium chloride (Run No.2'), N-[3-octylsulfonamido-propyl] N,N,N-trimethylammonium iodide (Run No.3'), N-propyl-octylsulfonamide-propylsulfonyl-N', N'-dimethyl-N'-hydroxyethylammonium chloride (Run No.4') or N-[3-octanoylamidepropyl]-N,N-dimethyl-N-carboxymethylammonium betaine (Run No.5'). The results obtained are summarized in Table 8 on the basis of Comparative example 1 as a standard.

TABLE 8

| Item | The first measurement | The second measurement | Condition of piled up sludge |
|---|---|---|---|
| This invention | | | |
| Run No. 1 | O~△ | O | O~△ |
| Run No. 2 | O~△ | O~△ | O |
| Run No. 3 | O~△ | O | O~△ |
| Run No. 4 | O~△ | O | O |
| Comparative example | | | |
| Run No. 1' | X | X | X |
| Run No. 2' | X | X | X |
| Run No. 3' | X | X | X |
| Run No. 4' | X | X | X |
| Run No. 5' | X | X | X |

As can be seen from the results in Table 8, the piling up of sludges was scarcely observed on the stainless steel surface in Example 11 by the treating method of this invention. In contrast to this, the remarkable filing up of sludges was observed wholly on the stainless steel surface in Comparative example 9.

EXAMPLE 12

The respective samples of Example 11 and Comparative example 9 were evaluated by Model test methods (2) and (3), and there was the same tendency in the results obtained by both the Model test methods. The material of the metallic surfaces was found to have no effect on the piling up of sludges.

EXAMPLE 13 AND COMPARATIVE EXAMPLE 10

The following samples were allowed to stand respectively in a hot-air dryer at 230° C. for 24 hours to form sludges: compositions of 94 parts of a random copolymer (molecular weight:3000) of a butanol-terminated polyalkylene glycol (copolymerization ratio PO-/EO=65/35 by weight) and 6 parts each of N-[(3-perfluorooctanesulfonamide)propyl]-N,N,-trimethylammonium iodide (Run No.1), N-[3-(perfluorooctanesulfonamide)-propyl] N',N'-dimethyl-N'-carboxymethylammonium betaine (Run No.2), N-[3-+-octanesulfonamide-+-propyl]-N,N,N-trimethylammonium iodide (Run No.1' of Comparative example 10) or N-[3-(octanesulfonamide)-propyl]-N,N-dimethyl-N-carboxymethylammonium betaine (Run No.2' of Comparative example 10).

Sludges from Run Nos. 1 and 2 of Example 13 (sludge—1 and sludge—2) and sludges from Run Nos. 1' and 2' of Comparative example 10 (sludge—3 and sludge—4) were evaluated in a new stainless steel dish by Model test method (4). The results obtained are summarized in Table 9.

TABLE 9

| | Sludge No. | Observation of change in sludge |
| --- | --- | --- |
| This invention | | |
| Run No. 1 | Sludge - 1 | O |
| Run No. 2 | Sludge - 2 | O |
| Comparative example | | |
| Run No. 1' | Sludge - 3 | X |
| Run No. 2' | Sludge - 4 | X |

The results show that the surfaces of the sludges obtained by the method of this invention were modified.

[The Second Aspect]

The second aspect of the invention, a modification of the first aspect, is described hereinafter.

The object of this invention is to provide an epoch-making processing method wherein the cleaning of a heater is not required for a continuous operating time, periodic maintenance term of 20 to 30 days or longer resulting from the equipment capacity in draw-false twist texturing of partially drawn polyester yarns involving severe heat—treatment thereby to permit high-speed transfer.

Another object of this invention is to prevent the occurrence of broken filaments, fluffs and broken yarns in the high-speed false twist texturing, promote the stabilization of the operation and permit the high-speed transfer, whereby textured high-grade yarns are provided at a high productivity.

The expression "the cleaning of a heater is not required" means "a condition wherein substances formed by the thermal deterioration of a lubricating composition will not be piled up on the surface of the heater for the interval of periodic maintenance or longer of a texturing machine in the draw-false twist texturing, and therefore the cleaning of the heater becomes necessary", indicating that the high-speed transfer can be conducted during the time of no cleaning. More specifically, the interval of the periodic maintenance of the texturing machine in the conventional high-speed false twist texturing is generally about 20 to 30 days; however, the cleaning interval of the heater is shortened with increasing texturing speed. The heater should be usually cleaned at an interval of about 1 day to 1 week in the case of ordinary treating agents. In this invention, the abovementioned expression means that the cleaning of the heater is not necessary for an interval of 20 to 30 days described above or at least about 15 days, anmely, the continuous operational time related to the mechanical performance of the texturing machine or longer.

Therefore, the transfer can be made by autodoffers even at a high speed to permit the continuous production of textured yarns with very high productivity.

[Prior Art]

In producing textured polyester yarns, the texturing speed has been recently more increased for improving the productivity. The texturing conditions tend to be still severer, for example the increase in contact pressure of yarns with various rollers, guides, heaters and the like, and increase in heat-treating temperature with increasing yarn speed. For example, the frictiontype false twist texturing method or false twist texturing method employing belts has been adopted in place of the conventional systems employing a spindle-type false twister in producing false twist textured yarns, and the texturing speed has been remarkably increased. In the friction-type false twist texturing, remarkable progress has been made in various types of mechanical equipment for improving the productivity, and the texturing has been recently carried out at a high speed of 400 m/min to 600 m/min or further exceeding 1000 m/min. The heater temperature has been simultaneously increased from the range of 160° to 190° C. to the range of 200° to 230° C. or further 240° C. However, the following facts are well known: The increase in friction between filamentary yarns and guides metallic bodies under such severe conditions of higher speeds and higher temperatures squeezes or rubs off textile finishes and polymeric components, which are transferred to the heater surface. The textile finishes are then deteriorated thermally by heat treatment at a high temperature to cause carbonization or resinification and remarkably stain the heater surface with materials containing oligomers and the like present on the fibrous surface. If such solid resinous materials once stick to the heater surface, the resinous materials will pile up successively to damage the filamentary yarns running at a high speed thereon, cause fluffs or broken yarns and endanger the operation stability. Therefore, the heater is usually cleaned repeatedly at an interval of 2 days to one week. However, the cleaning operation of the heater detracts the feature from the texturing machine capable of continuous operation for 20 to 30 days except the staining problems of the heater surface, thus markedly deteriorating the productivity.

In order to meet such problems, it is ideal to prevent the formation of resinous components on the heater. Theoretically, it is desirable to appply a textile finish or a spin finish which is not thermally decomposable at all to the fibrous surface or use the textile finish which will leave no residue even on the thermal decomposition. However, a textile finish stable at a high temperature of 215° C. or above for a long time is scarcely found in effect, and there is almost no textile finish leaving no residue on thermal decomposition. Furthermore, the resinification problem of impurities contained as a component even in a minimum amount in the textile finish by the oxidative decomposition cannot be avoided as far as the textile finish is an organic substance.

Incidentally, in the recent high-speed drawing and friction-type false twist texturing, polyalkylene glycols have been often used as a main component in lubricants of textile finishes as described in Japanese Patent Publication No. 11785/1981 and Japanese Patent Laid-Open No. 82195/1973. The use of such polyalkylene glycols is considered to be based on characteristics that resinous substances formed in a very small amount on thermal decomposition scarcely change into oil droplets which will never stain the surroundings and the like substantially. However, these polyalkylene glycols are incapable of meeting the stainproof problem of heaters with increasing speed and temperature. For example, hard resinous substances will be piled up on the heaters at a yarn speed of 700 m/min or higher for several hours or at most about several days to cause fluffs and broken yarns and further make the transfer quite impossible. The polyalkylene glycols are confronted with problems wholly adverse to the improvement in operational stability and productivity. The problems have been highlighted as a very great trouble. In detail, the transfer can be made relatively readily at a speed of 500 m/min or lower, particularly a comparatively low speed of 300 to 400 m/min though the staining of heaters is related to the smooth running of knots without yarn breakage in transfer. In case the yarn texturing speed is increased to 500 m/min, particularly 600 m/min or 700 m/min or higher, the following disadvantages will be caused: Knots meet with shock resistance of the slightly protruded sludge surface even in the case of very little staining on the heaters to deteriorate the smooth running thereof remarkably at a high speed. Thus, the heater surfaces much be frequently cleaned. With the ordinary textile finishes, yarns can be textured only for a short time of about 1 to 3 days, and the transfer is not usually made at a high speed practically due to the low productivity. According to supplementary examinations on this problem made by the present inventors, it is confirmed that 100% of polyalkylene glycols, containing little impurities, and leaving residues in a very small amount by the thermal decomposition is entirely ineffective for the stainproof problem in the drawfalse twisting process at a high speed and temperature.

As a result of intensive research made to overcome the above-mentioned disadvantages, the present inventors have aimed at taking the viewpoint such as the adoption of textile finishes having the unique function thereof, decomposing thermally on the heater surfaces positively without sticking or piling up decomposed substances on the surfaces quite contrary to the conventional investigation in heat resistance of textile finishes, considering that it is most difficult to find out the textile finishes which will not thermally decompose as far as organic substances are used as the finishes.

On further investigation, based on the aforementioned viewpoint, it has been surprisingly found that the desired effects can be produced by draw-false twist texturing partially oriented yarns to which a textile finish composition comprising a polyalkylene glycol or a derivative thereof is applied and a compound, having a fluoroalkyl group and a weight loss ratio of 20% by weight or less at 200° C. at a heating rate of 10° C./min in air, and thermally decompable at 200° C. for 24 hours in air at a weight loss ratio of 40% or more on thermal decomposition thereof or a textile finish composition comprising a metallic sulfonate having a fluoroalkyl group and a weight loss ratio of 5.0% by weight or less at 300° C. at a heating rate of 10° C./min in air and a weight loss ratio of 10% or less on thermal decomposition at 200° C. for 24 hours in air in an amount within a specific range at a high speed and temperature.

Thus, in the second aspect of this invention, there is provided a method for treating running yarns, which comprises applying a lubricating composition comprising [A] 99.9% by weight or less of a polyalkylene glycol or a derivative thereof thermally decomposable at 150° C. in air and [B] 0.1% by weight or more of (B-1) a compound having a perfluoroalkyl group of 3 to 20 carbon atoms, a weight loss ratio of 20% or less at 200° C. at a heating rate of 10° C./min in air and a weight loss ratio of 40% or more on thermal decomposition at 200° C. for 24 hours in air and/or (B-2) an alkali metallic salt of a perfluoroalkylsulfonic acid or perfluoroalkylaromatic sulfonic acid having at least one fluoroalkyl group of 3 to 20 carbon atoms, a weight loss ratio of 5.0% by weight or less at 300° C. at a heating rate of 10° C./min in air and a weight loss ratio of 10% by weight or less on thermal decomposition at 200° C. for 24 hours in air in an amount of 0.1% by weight or more and less than 0.5% by weight based on the weight of polyester multifilamentary yarns having a birefringence of 0.03 to 0.08 and an elongation of 30 to 250% to said multifilamentary yarns, bringing said treated yarns continuously into contact with a contacting body kept at a surface temperature of 215° C. or above at a yarn speed of 500 m/min or higher, and darw-false twist texturing the yarns while positively decomposing thermally the lubricating composition transferred to the contacting body.

This invention will be further described hereafter.

The polyalkylene glycol used as one component in the lubricating composition of this invention has been often used as textile finishes as described above. It is, however, well known in recent times that resionus substances will be piled up slowly with time by the thermal decomposition at a heater temperature of 215° C. or above and a high texturing speed as far as the compound having the above-mentioned specific fluoroalkyl group is absent in the textile finishes even if used in any state. The tendency increases still more with increasing heater temperature and texturing speed, and broken yarns or fluffs are increased if heaters are not cleaned at an interval of about several hours or one week, whereby the transfer cannot be conducted by autodoffers to deteriorate remarkably the productivity. On the other hand, the concept of adding compounds having a fluoroalkyl group to the well-known textile finishes is disclosed in for example the following references: (a) Japanese Patent Laid-Open Nos. 140171/1981 and 140180/1981, and the blending of the well-known fluorine-containing surfactants into textile finishes is described in (b) Japanese Patent Laid-Open No. 124399/1974, (b) Japanese Patent Laid-Open No. 53277/1981, (e) Japanese Patent. Laid-Open No. 46923/1979 and the like. However, most of the conventional propositions are the impartment of properties of the fluorine-containing compounds to textile oils as follows: the uniform application by the reduced surface tension unique to the fluorine-containing compounds; improvement in the antistatic properties; and reduction in friction.

All the aforementioned propositions, however, are entirely different from the technical idea of this invention.

Thus, in the reference (a), salts of ester compounds, obtained by reacting salts of specific dicarboxylic acids and/or said dicarboxylic acids with compounds having a hydroxyl group in the molecule, and having at least one carboxyl group are added to often used textile oils based on esters or polyesters. Although specific compounds such as salts of alkyl-substituted aminodicarboxylic acids or derivatives thereof having a fluoroalkyl group as a carbon chain are described in the salts of the dicarboxylic acids, the object in using the compounds is only to inhibit the generation of static electricity by the increase in friction and prevent the occurrence of fluffs and broken yarns by the reduction in friction of filamentary yarns with guides, compensators, rollers, heat-treating heaters and the like as described in the specification of (a). The composition of the textile finishes and other specific relations are not found in the specification at all. Furthermore, in the specification of (b), there is described a blend consisting of salts of ester compounds, obtained by reacting limited polyalkylene oxides with salts of specific dicarboxylic acids and/or the above-mentioned dicarboxylic acids and compounds having a hydroxyl group in the molecule, and having at least one carboxyl group with salts of phosphoric esters containing a specific higher alkyl or aralkyl polyoxyalkylene ether group. Salts of aminodicarboxylic acids or derivatives thereof having a fluoroalkyl group as a carbon chain among the salts of the dicarboxylic acids are disclosed in the reference (b). As already described in the specification thereof, its object is to minimize the amount of nonvolatile anionic surfactants and the like directly causing the heater sludge and carry our the stable draw-false twist texturing while improving the heat resistance of the textile finishes remarkably by the use of the specific two or three salts mentioned above. Therefore, the reference (a) will not teach us the effects of positive decomposition on the prevention of the piling up of decomposition products as seen in the textile finish used in this invention.

The reference (b) is based on a very general idea of using simply fluorine-containing compounds in the textile finishes, and the object is to improve only the lubricity as compared with the non-fluorine textile finishes. There is disclosed only improved lubricity and resistance of needles to abrasion as effects.

In the reference (c), the object is only to provide the uniform application thereof at a high speed based on the phenonmenon of reduction in surface tension of all the textile finishes consisting essentially of mineral oil by adding fluorine-containing compounds, and there is described only improved lubricity, coherency and antistatic properties and reduced resistance of needles to abrasion.

In the reference (d), the description overlaps almost with (b) Japanese Patent Laid-Open No. 124399/1974 and (c) Japanese Patent Laid-Open No. 18993/1977. The same effect of the compounds belonging to the category described in the reference (c) as that of those, such as improved lubricity, antistatic properties and resistance to abrasion, particularly improved antistatic properties and uniform sticking properties, are described, and the idea of expecting the effect of surface treatment of heaters and surface modification of sludges on heaters on the prevention of the piling up of decomposition products while decomposing the textile finishes is not found at all in the reference (c).

On the other hand, in the reference (e), the object is to reduce the amount of textile oils to be transferred from yarns to heaters and promote the further reduction by adding an antioxidant to the textile oils in order to inhibit the transfer of piled up tarry substances formed by the deterioration of the textile oils to the heater plates very effectively in the heat-treating step at a high speed from the viewpoint of preventing the staining on heat-treating heaters. Silicones and fluorine-containing compounds are described as the examples of the textile finishes. However, the reference (e) aims at the use of thermally stable substances having a volatile weight loss of 10% or less at 200° C., and the specification describes clearly that the desired effect cannot be obtained by substances having a large volatile weight loss at 200° C. for 48 days due to the volatilization in the heating step. In the reference (e), there is no idea of modifying the heater surface and converting decomposition products into releasable sludges not to grow and pile up the decomposition products by the modification of the heater surface and sludge surface while decomposing the lubricating composition positively as in this invention.

On the other hand, according to this invention, the cleaning interval of heaters can be remarkably prolonged by the synergistic action of thermal conditions such as the heater temperature set at 215° C. or above resulting from the increase of texturing speed to 500 m/min or higher with the characteristics of textile finishes (oiling agent mixtures) in the simultaneous or successive draw-false twist texturing of a partially oriented polyester yarn (hereinafter abbreviated to POY) as typically described in Japanese Patent Laid-Open No. 35112/1973, and the constitution thereof will be described hereafter.

The term "polyester" used in this invention refers to a polyester comprising 80 mole % or more, preferably 90 mole % or more, of ethylene terephthalate in the repeating units, and examples of the third component to be copolymerized in a proportion of 20 mole % or less include dibasic acids such as isophthalic acid, phthalic acid, methylterephthalic acid, hexahydroterephthalic acid, naphthalenedicarboxylic acid, diphenyl dicarboxylic acid, sebacic acid, dipic acid and the like; glycols such as neopentyl glycol, trimethylene glycol, hexamethylene glycol, 1,4-cyclohexanedimethanol, 1,4-bishydroxybenzene, bisphenol A and the like; hydroxycarboxylic acids such as glycollic acid, p-hydroxybenzoic acid and the like; or functional derivatives thereof. These polyethylene terephthalates may contain a polymerization adjustor, stabilizer, delustering agent, colorant, and the like.

POY is a filamentary yarn prepared by melting these polymers, and taking up the extruded polymers at a spinning (taking off) speed of about 2500 m/min or higher, and the POY as such preferably has the following physical properties: a birefringence of 0.03 to 0.08 and an elongation of 30 to 250%, for the subsequent draw-false twist texturing. A yarn having the properties beyond the above-mentioned ranges may cause various troubles in the drawing and texturing performances. The draw-false twist texturing methods include simultaneous and successive draw-false twist texturing methods, and generally the former is preferably adopted.

The following false twist texturing devices are advantageous to the high-speed false twist texturing: disk friction type Japanese Patent Laid-Open Nos. 23346/1976 and 82052/1976), belt type (Japanese Patents Laid-Open Nos. 112246/1979 and 79724/1981), false-twist texturing method of introducing yarns into the gap between the engaging surfaces of frictional rotating bodies oppositely rotating in contact (Japanese Patent Laid-Open Nos. 11708/1976 and 25428/1982) and the like.

The polyalkylene glycol [component A] to be used in this invention is as already exemplified. The content of the polyalkylene glycol in the total textile finish is 99.9% by weight or less, preferably 50 to 99.9% by weight, and more preferably 85 to 99.9% by weight.

Some kinds of the polyalkylene glycol to be added emit smoke or increase the amount of tarry substances at a temperature of 215° C. or above to cause serious staining on the metallic or ceremic surfaces of heaters, and therefore the surroundings are stained or products per se are seriously stained to cause disadvantages. Therefore, a composition which forms only a minimum amount of sludges even on thermal decomposition at 215° C. or above is particularly preferred for this invention. Thus, a lubricating composition comprising a polyalkylene glycol or a derivative thereof comprising 70% by weight or more of a polyether having a high copolymerization ratio of propylene oxide in the polyalkylene glycol or derivative thereof forming 5% by weight or less of sludges at 215° C. or above is suitably used to give especially improved effects.

Component (B-1) in the component [B] as an essential component to be added to the textile finish of this invention will be described hereafter. As the component (B-1), the following compound is used: At least one compound, having a fluoroalkyl group, and selected from (i) nonionic compounds, having at least one perfluoroalkyl group of 3 to 20 carbon atoms and obtained by adding an alkylene oxide of 2 to 4 carbon atoms to the molecule in the same molecule, (ii) compounds having the above-mentioned fluoroalkyl group and a salt of a carboxylic acid in the same molecule, (iii) compounds having the above-mentioned fluoroalkyl group and a salt of a phosphoric ester in the molecule, (iv) compounds having the above-mentioned fluoroalkyl group and a salt of a sulfate or sulfonate in the same molecule or (v) cationic compounds having the above-mentioned fluoroalkyl group and a quaternary nitrogen atom in the same molecule and (vi) amphoteric compounds having the aforementioned fluoroalkyl group and both anionic and cationic groups in the same molecule. The component (i) corresponds to the above-mentioned component (b-1); (ii) to (b-2); (iii) to (b-3); (iv) to (b-4); (v) to (b-5); and (vi) to (b-6) respectively. Among them, nonionic compounds which are liquid at room temperature and have a fluoroalkyl group in component (i) can be directly applied to the fibrous surface for use, and are of advantage due to the suitable use as a lubricating composition comprising 100% of the nonionic compounds. There are various compounds containing the fluoroalkyl group used in this invention, and some salts of the sulfonate compounds, sulfate compounds and carboxylic acid compounds are solid at room temperature. Among them, some solid salts have a very high melting point and are crystalline. Since these compounds cannot be easily applied to filamentary yarns stably, it is preferable to mix the compounds with the above-mentioned polyalkylene glycol or use them with nonionic compounds containing the fluoroalkyl group. In this sense, most preferably the salts are used mainly with nonionic compounds having the fluoroalkyl group.

However, the nonionic compounds alone are very expensive (the cost is 10 to 30 times that of the well-known compounds having no fluoroalkyl group), and the increase in cost due to the compounds even in a small amount of 0.1% by weight or mores and less than 0.5% by weight on the surface of a filamentary yarn is unavoidable. Therefore, the use of the compounds having the fluoroalkyl group alone is very disadvantageous to the economic efficiency, however much the productivity may be improved.

The thermal properties of main compounds in fluorine-containing compounds in the above-mentioned components (i) to (vi) will be described hereafter.

Component (b-1):

Nonionic compounds having the fluoroalkyl group will scarcely volatilize at a heating rate of 10° C./min and lose about 5 to 15% of the weight at 200° C. However, most of the compounds show a weight loss of 90% or more by heating at 200° C. or 225° C. for 24 hours in air, and thermally decompose at a high temperature. Thus, the formation of carbonyl groups is recognized by the determination of the infrared spectrum of decomposed sludges to confirm the conversion of the sludges into oxidation products.

Component (ii):

Most of the compounds will show a volatile weight loss of about 10% at a heating rate of 10° C./min, but thermally decompose by heating at 200° C. for 24 hours and exhibit a weight loss of 60% or more.

Component (iii):

Compounds containing a salt of a phosphoric ester and the fluoroalkyl group will scarcely volatilize at a heating rate of 10° C./min, and show a weight loss ratio of about 5 to 10% at 200° C. Most of the compounds exhibit a weight loss of 80% or more on heating at 200° C. for 24 hours, and the determination of the infrared spectrum shows the decomposition of the compounds at a high temperature for a long time. Thus, the conversion into oxidation products can be confirmed.

Component (iv):

The noteworthy facts on metallic salts are as follows:

Some of the compounds having the formula $R_f$(fluoroalkyl group)-$SO_3X$ or $R_f$-aromatic nucleus-$SO_3X$ wherein the —$SO_3$—X group directly linked to the fluoroalkyl group, shows a volatility of 40% by weight or less on thermal decomposition at 200° C. for 24 hours, but preferably used in the form of a partially neutralized metallic salt, i.e. about 60% or 70% neutralized and substituted by a metal, rather than the completely neutralized salt to show a volatile weight loss of 40% by weight or more at 200° C. for 24 hours.

More preferably, the salts are used as another salt, for example an amine salt.

The desired objects of this invention may be sufficiently achieved by salts of the above-mentioned sulfonic acids or sulfate compounds which are the well-known anionic surfactants having a fluoroalkyl group.

As described above, among the sulfonates containing the fluoroalkyl group, there are special alkali metallic salts of perfluoroalkylsulfonic acids or alkali metallic salts of perfluoroalkylaromatic sulfonic acids having a fluoroalkyl group of 3~20 carbon atoms, a weight loss of 5.0% by weight or less at 300° C. at a heating rate of 10° C./min in air and a weight loss of 10% by weight or less on thermal decomposition at 200° C. for 24 hours in air [component (B-2)]. These sulfonates have an exceptionally low decomposition ratio and are described as quite thermally stable. However, alkali metallic salts of sulfonic acids directly linked to the fluoroalkyl group or alkali metallic salts of aromatic sulfonic acids having at least one fluoroalkyl group are not undecomposable at all, and act effectively by the slight decomposition. Therefore, such salts are preferably used in combination rather than alone to produce a remarkable effect by the use together instead of a main component. For example, nonionic compounds having a fluoroalkyl group are preferably used with such sulfonates partially and further a polyalkylene glycol or a derivative thereof. The shape of the contacting body to be used in the false twist texturing process of this invention is not particularly limited; however, the often used contact-type false twisting heater having a V- or U-shaped groove is preferably employed in this invention. The surfaces thereof are of moderate surface roughness, and the material is ion or stainless steel, having a high surface strength, or further treated by the flame spray coating with ceramic. In the V- or U-shaped groove, a running yarn is passed over the heater surface in contact with the narrowed bottom of the groove to keep the stability of the yarn. Lubricants transferred from the yarns to the bottom are stuck thereto as a sludge to put a serious obstacle to the increase in texturing temperature, OPU and running yarn speed.

As for the draw-false twist texturing, disks are rotated on two or three shafts to false twist yarns at a high speed. However, the high-speed texturing has been carried out recently by using the belt method wherein revolving rubber belts intersect at a moderate angle. In this invention, the draw-false twist texturing device is not particularly limited; however, any methods of the draw-false twist texturing such as disks of the well-known ceramic disks, urethane disks or further rubber belts and the like may be applied to the method of this invention.

The oil pickup (OPU) of the textile finish (lubricating composition) based on the yarn is very critical in relation to the cleaning of heaters. In order to attain the object of this invention which is the effect on the prevention of piling up or sticking of thermal deterioration products to the heater surface, the textile finish in an amount of less than 0.5% and 0.1% or more based on the weight of the yarn needs to be applied. The OPU is closely related to the heater temperature of 215° C. or above in the texturing, and the transfer of the textile finish from the fiber surface to the heater at an OPU of 0.5% or more is continuously great in the high-speed texturing. Therefore, the following disadvantages are caused: The thermal decomposition rate of the textile finish is somewhat reduced. The piling up in the intermediate tarry state not in the sludge state is increased, and the heater surface must be cleaned. Thus, the OPU depends largely on the amount of the textile finish to be transferred from the fiber surface to the heater, and further on the heater temperature and false twist texturing speed. The amount of the textile finish to be transferred must be first reduced, and therefore the OPU is more significant than ever.

On the other hand, an OPU of less than 0.1% is insufficient to give the moderate lubricity to the fiber surface, and the uneven application increases fluffs, and in its turn causes broken yarns. Not only the product quality but also the productivity is markedly reduced, and therefore an OPU of less than 0.1% by weight is of no use.

As described above, an optimum OPU in the false twist texturing at a high speed is less than 0.5% by weight to 0.1% by weight, preferably within the range of 0.45 to 0.2% by weight in the texturing at a high speed.

The composition used in this invention is diluted with water to form an aqueous emulsion and the like, and applied to yarns by oiling methods with a roller, spray methods or the well-known methods in the spinning and drawing step.

The heater surface temperature is very critical in texturing yarns with a textile finish OPU of 0.1% by weight of more and less than 0.5% by weight based on the yarn as described above. In order to attain the object of this invention which is the effect on the prevention of piling up or sticking of thermal deterioration products to the heater surface, the heater temperature is at least 215° C. or above, preferably 220° C. or above. A higher heater temperature of 225° C. or 230° C. in such a range as to be allowable for the product yarn quality or texturing conditions is more preferable. This critical heater temperature can be understood from the preferred direction opposite to the conventional heater temperature and texturing stability. Thus, the difference between the effects of this invention and those of the prior art is obvious from the phenomenon. It is a striking fact that the effects of this invention will be uniquely produced still more with increasing false twist texturing speed such as 800 m/min or 1000 m/min. At a heater temperature of 215° C. or below, the following disadvantages are caused: The thermal decomposition rate of the textile finish per se transferred to the heater surface is reduced to increase the piling up rate from the decomposition rate, and therefore the heater must be cleaned. The use of the specific fluorine containing compound of this invention is unnecessary at all, and the textile finish consisting essentially of the well-known polyalkylene glycols are used without any problems.

Thus, the texturing speed particularly effective for texturing yarns with a textile finish OPU of 0.1% by weight or more and less than 0.5% by weight at a heater surface temperature of 215° C. or above depends on the crimp rigidity and productivity of products in false twist texturing. The effects of this invention are more advantageous to a texturing speed of 500 m/min or higher, preferably 600 m/min or higher, more preferably 700 m/min or higher, compared with the conventional speed of 500 m/min or less.

Generally speaking, in flase twist texturing polyester fibers, the heater length or surface temperature is increased to give a necessary quantity of heat to the fibers for increasing the texturing speed and improving the productivity. However, the heater length cannot be uselessly increased due to the restriction of economic efficiency and equipment.

This, the heater temperature is usually increased to carry out the high-speed texturing. In any case, both the heater temperature and the texturing speed are increased to improve the productivity, and the high-speed texturing of yarns with an ordinary textile finish by increasing the heater temperature is often encountered with problems that the heater must be cleaned at an interval of about several hours to one day. In this case, the textile finish OPU is decreased or the composition of the textile finish is changed to prevent the early sludge formation on the heater as much as possible. However, even a carefully selected textile finish on the well-known principle is very ineffective with an increase in texturing speed of 100 m/min even if the heater cleaning interval can be prolonged a little. Therefore, such problems cannot be actually met only by the extension of the prior art at all. This invention includes epoch-making technical contents breaking through the barrier on the quite contrary principle.

In accordance with the object of this invention, it is desirable to add a composition comprising 99.9% by weight or less of a polyalkylene glycol or a derivative thereof and 0.1% by weight or more of one or more compounds having at least one fluoroalkyl group or preferably further a component classified as the well-known ionic surfactant or lubricant to the textile finish. The well-known waxes, silicones, and low-molecular weight nonionic surfactants may be added thereto as far as the effects of this invention are not reduced. For some objects, small amounts of dyes, pigments, talc, mica, aluminum, and sizes, synthetic resin emulsions and the like may be added if necessary the textile finish.

According to this invention, the above-mentioned constitution creates a state wherein the heat deterioration products of the textile finish separated from yarns during the false twist texturing in contact with the heater surface at 215° C. or above will not be easily piled up on the heater surface.

The forming mechanism of the heat deterioration products which will not easily stick to the heater surface will be described hereafter.

Yarns coated with a textile finish comprising a polyalkylene glycol or a derivative thereof easily decomposable thermally at high temperatures as a main component and at least one compound having at least one fluoroalkyl group in the molecule are continuously or intermittently brought into contact with a heater surface heated at 215° C. or above, and the polyalkylene glycol or the derivative thereof is thermally decomposed on the heater surface heated at 215° C. or above in a short time and oxidized to form a brown sludgy substance. It is of interest that the marked formation of carbonyl groups is observed in the infrared spectrum of the sludgy substance and the treatment can be carried out by both the metallic and the sludge surfaces to modify the surface properties of the sludge per se formed by the thermal decomposition and not to grow the sludge further only under such conditions as to form the carbonyl groups in this invention. It is a marked feature that the effects of this invention cannot be obtained under such conditions as not to cause the positive thermal decomposition of the polyalkylene glycol, in other words, the effects of this invention are not recognized at low temperatures at all. Thus, the surface properties of the tar or sludge are not modified, and the textile finish of this invention will not act. The structure of the oxidation products containing the carbonyl groups formed by the thermal decomposition is quite unknown by the measurement of acid values, however, assumed as the formation of organic acids (ther infrared spectrum shows a great absorption at a wavenumber of 1735 $cm^{-1}$ after the formation of the sludge compared with no absorption before the formation thereof). Thus, a quite unknown mechanism has been found out as follows: a complicated complex of a compound containing an oxidation product formed by the decomposition with an oxidation product of a compound having a relatively thermally stable fluoroalkyl group is formed to treat the metallic surfaces always at 215° C. or above and also sludge surfaces simultaneously thereby converting the sludge into a temporarily sticking substance in addition to the modification of the metallic surface.

Model tests were made to explain the effects of this invention in detail and adapt well to the practical case, and a texturing machine was operated for a long period to evaluate the effects of this invention.

Model test method (5)

Measurement of volatile weight loss

The weight loss on heating of a compound having a perfluoroalkyl group used in this invention was measured by using 20 mg of the sample in a thermobalance and differential thermal analyzer type 8075DI manufactured by Rigaku Corporation in air at a heating rate of 10° C./min at a temperature up to 400° C.

The weight loss at 200° C. was read from the chart and calculated. As for the sulfonic acid constituting the component (B-2), the weight loss at 300° C. was read from the chart and calculated.

Model test method (6)

Volatile weight loss by thermal decomposition and piling up property by repeated tests (1) Compounds having the fluoroalkyl group used in this invention (alone).

One gram of a sample was collected in a stainless steel dish (diameter:5 cm, depth:0.8 cm) and allowed to stand in a hot-air dryer at 200° C. for 24 hours. The stainless steel dish was then taken out and cooled to weight the formed sludge and determine the weight loss by the thermal decomposition.

Model test method (7)

Evaluation of releasability and piling up property as a textile finish

Two grams of a sample were weighed accurately into a stainless steel dish (diameter:5 cm, depth:0.8 cm) and allowed to stand in a hot-air dryer at 200° C. for 24 hours. The stainless steel dish was then taken out and cooled to wipe off gently the formed sludge. The surface conditions of the stainless steel were observed and the weight of the removed sludge was measured to determine the releasability. The same sample was then introduced into the dish, and the same procedures were repeated two, three and four times to evaluate the piled up conditions of the sludge based on five ratings of O to X.

Model test method (8)

(Evaluation by false twisting)

In addition to the Model test methods described above, the following test was made:

To partially oriented 78-denier, 36-filament filamentary yarns, was applied less than 0.5% by weight to 0.1% by weight of the textile finish used in this invention. The resulting filamentary yarns were then false twist textured with 100 spindles of outer contact friction-type false twisters having three frictional disks each on a rotating shaft while being drawn at a heater temperature of 215° C. or above, a texturing speed of 500 m/min or higher and a draw ratio of about 1.5. The yarn breakage ratio in passing knots through heaters in high-speed transfer and the staining conditions of the heaters on the poor yarn breakage ratio in running knots observed with the naked eye and evaluated as follows:

O: No staining and a yarn breakage ratio of 10% or less in transfer

Δ: Slight staining and yarn breakage ratio of 10 to 30% in transfer

X : Staining and a yarn breakage ratio of 30% or higher in transfer.

Mark O means that knots can be passed heaters in the transfer for 20 days or longer without cleaning the heaters. In the case of mark Δ, the data indicate the average number of days till the yarn breakage ratio in passing knots through heaters in the transfer test becomes 10 to 30%, and the heater must be cleaned at an interval of the indicated number of days. In the case of mark X, the data indicate the number of days requiring the cleaning of heaters to give a yarn breakage ratio of 30% or higher in passing knots through heaters in the transfer test.

This invention will be illustrated by the following examples wherein "parts" and "percentages" are by weight. In order to explain the importance of limitations of this invention, examples will be given to clarify the following:

Example 14: Difference between the compounds having the fluoroalkyl group used in this invention and compounds having no fluoroalkyl group, Example 15: Use of compounds having the fluoroalkyl group together, Example 16: Limitations of OPU, Example 17: Limitations of heater temperature, and Example 18: Limitations of texturing speed. Comparative examples are shown in the respective Examples to describe the effects of the nonionic compounds having the fluoroalkyl group used together and the like. However, this invention is not limited by the Examples detailed hereinafter.

EXAMPLE 14 AND COMPARATIVE EXAMPLE 11

Compositions as described in Table 10 as a 10 weight % aqueous emulsion were applied to filamentary yarns melt spun from polyethylene terephthalate at a spinning speed of 3000 m/min to give an OPU of 0.3% by weight. The resulting undrawn, 115-denier, 36-filament filamentary yarns (POY) (elongation: 145%) were then draw-flase twist textured with outer contact friction-type false twisters having three urethane frictional disks, having a dimeter of 45 mm, and rotating at 6250 rpm at a draw ratio of 1.5, a heater temperature of 220° C. and a texturing speed of 700 m/min. The number of days till the yarn breakage ratio in passing knots through heaters in the transfer test exceeds 10% and the presence of sludges on the heaters by the visual examination were determined to show the results by the number of days for the cleaning interval.

Compounds (a) to (h) and (j) to (k) were used as compounds having the fluoroalkyl group to be used in this invention, and a compound having the same structure but not containing fluorine atoms in the alkyl chain used in Comparative examples (1')~(6').

Compound (a):
N-propylperfluorooctanesulfonamide wherein propylene oxide and ethylene oxide at a weight ratio of 75:25 are added as a random copolymer (molecular weight: 2000) (6.3% , 92%)—component (i), Compound (b):
potassium salt of perfluoroalkyl ($C_8$) N-ethylsulfonylglycine (10%, 75%)—component (ii), Compound (c):
ammonium salt of bis-[N-(perfluorooctylsulfonyl)-N-ethyl-aminoethyl]phosphate (7.0%, 9.1%)—component (iii), Compound (d):
N-[3-(perfluorooctylsulfonamide)-propyl]N,N,N-trimethylammonium chloride (9.5%, 74%)—component (v), Compound (e):
N-[3-(perfluorooctanesulfonamide)-propyl]-N,N-dimethyl-n-carboxymethylammonium betaine (8.0%, 62%)—component (vi), Compound (f):
sodium perfluoroalkenyl ($C_9$) oxybenzenesulfonate (3.0%, 8.0%)—component (B-2), Compound (g):
potassium perfluoroalkyl ($C_8$) fulfonate (0.5%, 1.0%)—component (B-2), Compound (h):
N-polyoxyethylene (EO=15)
N-propyl-perfluorooctanesulfonamide (15.0%, 93%)—component (i), Compound (i):
sodium perfluoroacetate (28%, 99.5%)—Comparative example, Compound (j):
sulfate of N-polyoxyethylene (EO=3)-N-propylperfluorooctanesulfonamide (8.2%, 85%)—component (iv), and Compound (k):
80% neutralized ethanolamine salt of perfluorooctanesulfonic acid (9.2%, 65%)—component (iv)

The figures in the above-mentioned parentheses indicate the results obtained by Model test method (5) in the former and those obtained by Model test method (6) in the latter.

TABLE 10

Textile finish compositions of this invention and comparative examples.

| | Run No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Composition of Textile finish | Polyalkylene Glycol *1 | 89 | 89 | 94 | 94 | 94 | 98 | 98 | 88 | | 47 | 97 | 94 | 94 | 97 |
| | Potassium laurylsulfonate | 1 | 0.5 | 1 | | 1 | | | 1 | 2.5 | 3 | | | | 0.5 |
| | POE (1) lauryl phosphate | | 0.5 | | 1 | | | | 1 | 2.5 | 3 | | | | |
| | The invention (a) | 10 | | | | | | | | 95 | 47 | | | | |
| | The invention (b) | | 10 | | | | | | | | | | 1 | | |
| | The invention (c) | | | 5 | | | | | | | | | | 1 | |
| | The invention (d) | | | | 5 | | | | | | | | | | |
| | The invention (e) | | | | | 5 | | | | | | | | | |
| | The invention (f) | | | | | | 2 | | | | | 1 | | | 0.5 |
| | The invention (g) | | | | | | | 2 | | | | | | | |
| | The invention (h) | | | | | | | | 10 | | | 2 | 5 | 5 | 2 |
| | The invention (j) | | | | | | | | | | | | | | |
| | The invention (k) | | | | | | | | | | | | | | |

TABLE 10-continued

Textile finish compositions of this invention and comparative examples.

| Evaluation | Model test method (7) Model test method (8) | 20< | 20< | 20< | 20< | 20< | 20< | −(Δ) 20< | 20< | 20< | 20< | 20< | 20< | 20< | 20< |
|---|---|---|---|---|---|---|---|---|---|---|---|---|---|---|---|
| | | \multicolumn{7}{c}{This invention (Example 14)} | \multicolumn{7}{c}{Comparative Example 11} | |
| | Run No. | 15 | 16 | 17 | 18 | 19 | | 1' | 2' | 3' | 4' | 5' | 6' | 7' | 8' | 9' |
| Composition of Textile finish | Polyalkylene Glycol *1 | 99.6 | 99.4 | 99.65 | 94 | 98 | | 100 | 98 | 94 | 90 | 95 | 95 | 99.72 | 99.92 |
| | Potassium laurylsulfonate | 0.1 | 0.2 | 0.1 | 1.0 | | | | 1 | 3 | | | | 0.1 | |
| | POE (1) lauryl phosphate | | 0.2 | 0.1 | | | | | 1 | 3 | | | | 0.1 | |
| | The invention (a) | | | | | | | | | | | | | | |
| | The invention (b) | 0.1 | 0.2 | 0.15 | | | | | | | (b') 10 | | | 0.08 | | [i] 3.0 |
| | The invention (c) | | | | | | | | | | | (c') 5 | | | | |
| | The invention (d) | | | | | | | | | | | | (d') 5 | | | |
| | The invention (e) | | | | | | | | | | | | | | | |
| | The invention (f) | | | | | | | | | | | | | | 0.03 | |
| | The invention (g) | | | | | | | | | | | | | | | |
| | The invention (h) | 0.2 | | | | | | | | | | | | | 0.05 | |
| | The invention (j) | | | | 5 | | | | | | | | | | | |
| | The invention (k) | | | | | 2 | | | | | | | | | | |
| Evaluation | Model test method (7) | | | −Δ | | | | x | x | xx | xx | xx | xx | x−Δ | x−Δ | x |
| | Model test method (8) | 20< | 15< | 15< | 15< | 15< | | 4 | 3 | 1 | 1 | 1 | 1 | 3 | 5 | 3 |

*1 Polyalkylene glycol: random copolymer (copolymerization ratio PO/EO = 70/30 by weight, molecular weight : 4000)

As can be seen from Table 10, the effects of this invention are entirely different from the conventional ideas. In Table 10, the heater cleaning interval is remarkably shortened with increasing amount of anionic surfactants to be a direct cause of sludges as shown in Run Nos. 1', 2' and 3' of Comparative example 11. However, even 100% of the polyalkylene glucol obtained by improving the purity transferred to the heater forms decomposed resins by the thermal decomposition as shown in Run No.1' wherein only the polyalkylene glycol was used. The resulting sludges made the high-speed transfer difficult and markedly deteriorate the smooth running of knots, and the cleaning interval was about 4 days at most. In Comparative example 11, compound (b') has the same structure as compound (b), and the alkyl group has no fluorine.

Compound (d') consists of the same alkyl group having no fluorine as in compound (d); however, it is quite obvious that the effects of this invention are not recognized in compounds (b'), (c') and (d') at all.

As described above, the effects of this invention are based on the mechanism entirely different from those of the conventional finishes.

EXAMPLE 15 AND COMPARATIVE EXAMPLE 12

Compositions described in Table 11 as a 10 weight % aqueous emulsion were applied to filamentary yarns melt spun from polyethylene terephthalate at a spinning speed of 3300 m/min to give an OPU of 0.35% by weight. The resulting 115-denier, 36-filament filamentary yarns (POY) (elongation: 130%) were textured by the same method as in Example 14. The results obtained are shown in Table 11.

TABLE 11

Textile finish compositions of this invention and comparative example

| | | \multicolumn{8}{c}{This invention (Example 15)} | \multicolumn{4}{c}{Comparative Example 12} |
|---|---|---|---|---|---|---|---|---|---|---|---|---|---|
| | | 20 | 21 | 22 | 23 | 24 | 25 | 26 | 27 | 10' | 11' | 12' | 13' |
| Composition of Textile finish | Polyalkylene Glycol *1 | 98 | 54 | 68 | 53 | 4 | 44 | 50 | 90 | 98 | 64 | 49 | 14 |
| | POE (5) lauryl decanate | | 30 | | | | 30 | | | | 30 | | |
| | Mineral oil (170 sec) | | | 30 | | | | 15 | | | | 30 | |
| | Dodecyl isostearate | | | | 30 | | | 15 | | | | | |
| | POE (5) 1,6-hexanedilaurate | | | | | 60 | | | | | | | 60 |
| | POE (12) hardened caster oil | | | | | 20 | | | | | | | 20 |
| | $C_{14} \sim C_{15}$ block polyester *2 | | | 15 | 15 | | 15 | 15 | | | | 15 | |
| | Potassium lauryl sulfonate | | 3 | | | 3 | 0.5 | | | 1 | 3 | 3 | 3 |
| | POE (5) lauryl phosphate | | 3 | | | 3 | 0.5 | 1 | | 1 | 3 | 3 | 3 |
| | This invention (a) | | 10 | | | 10 | | | 7 | | | | |
| | This invention (b) | 2 | | 2 | 2 | | | | | | | | |
| | This invention (c) | | | | | | 10 | | | | | | |
| | This invention (f) | | | | | | | 1 | 1 | | | | |
| | This invention (h) | | | | | | | 3 | 2 | | | | |
| | Model test method (7) | | | | | | | | | x | xx | xx | xx |
| | Model test method (8) | 20< | 15< | 20< | 20< | 15< | 20< | 20< | 20< | 3 | 1 | 1 | 1 |

*1 The same as in Example 14.
*2 Block copolymer (copolymerization ratio PO/EO = 60/40 by weight, molecular weight: 1500)

As can be seen clearly from Table 11, the compositions of this invention showed outstanding effects. The well-known textile finish compositions were not found to give the effects of this invention at all as shown in the data of Model test method (7) in Run No. 10' to 13' of Comparative example 12.

EXAMPLE 16 AND COMPARATIVE EXAMPLE 13

Run Nos. 11 and 27 in Examples 14 and 15, Run No. 2' of Comparative example 11 and Run No. 11' of Comparative example 12 were selected and applied to semi-dull 115-denier, 36-filament filamentary yarns (POY) to give an OPU of 0.05, 0.15, 0.23, 0.42, 0.56, 0.75 and 0.98% by weight respectively. The resulting filamentary yarns were then textured at a texturing speed of 700 m/min, a draw ratio of 1.5 and heater temperature of 225° C. The compositions of this invention showed the cleaning interval of 15 days or more for the OPU of the applied compositions of 0.15, 0.23 and 0.42%. The cleaning interval was 20 days or longer for the OPU of 0.15 to 0.23% in the relation between the cleaning interval of 15 days or longer and the OPU. A lower OPU of the applied composition is preferred. Only a cleaning interval of about 1 week was obtained in texturing yarns with an OPU of 0.5% or more, and a difficulty is rather caused. This is considered as due to the higher piling up rate than the heat decomposition rate. There is a limit to the POU of the applied composition even in the case of an excellent composition. On the other hand, only a cleaning interval at most within 4 days is obtained even if the OPU of the applied composition having no fluoroalkyl group as opposed to the composition of this invention is reduced. Futhermore, the lubricity is insufficient for an OPU of 0.05% or less due to the absence of uniform application. Yarns with an OPU of 0.05% cannot be textured due to many fluffs and broken yarns.

EXAMPLE 17 AND COMPARATIVE EXAMPLE 14

Compositions of Run Nos. 11 and 27 in Examples 14 and 15 and the composition of Run No. 2' in Comparative example 11 were applied to semi-dull 115-denier, 36-filament, POY yarns to give an OPU of 0.35% by weight respectively. The resulting yarns were then false twist textured with the same outer contact friction-type false twisters as in Example 14 at a texturing speed of 700 m/min or less, a draw ratio of 1.5 and a heater temperature of 195 to 240° C.

As a result, there is an indistingushable difference among Run Nos. 11, 27 and 2' at a heater temperature of 215° C. or below. The yarn breakage ratio in passing knots through heaters at a high speed was rapidly deteriorated at an increased heater temperature of 215° C. or above, 220° C. or further 225° C. in Run No.2', and a cleaning interval of only about 1 to 2 days was obtained at a heater temperature of 220° C. On the other hand, the compositions of this invention showed remarkable effects thereof at higher heater temperatures of 220° C. and 225° C. The dependence of heater cleaning interval on the heater temperature was rather decreased.

EXAMPLE 18 AND COMPARATIVE EXAMPLE 15

Compositions of Run Nos. 11 and 27 in Example 14 and the composition of Run No.2' in Comparative example 11 were applied to semi-dull 115-denier, 36-filament POY yarns to give an OPU of 0.4% by weight. The resulting filamentary yarns were then textures with outer contact friction-type false twisters at a draw ratio of 1.5, a heater temperature of 220° C. and a texturing speed varied from 300 to 1000 m/min.

There was not a significant difference between the compositions of this invention and Comparative example at a relatively low temperature. However, the difference became distinct at a texturing speed of 500 m/min or higher. At a high texturing speed of 600 m/min or 700 m/min, a marked difference was recognized in the yarn breakage ratio in passing knots through heaters between this invention and Comparative example. The cleaning interval in Run Nos. 11 and 2' was only about 1 day. Thus, the high-speed transfer cannot be substantially conducted. However, the heater cleaning interval was 20 days or longer at a false twist texturing speed of 500 m/min or higher, 700 m/min, 800 or 1000 m/min in Run No. 11 of this invention, and the high-speed transfer was possible.

What is claimed is:

1. A method for treating metallic or ceramic surfaces, which comprises applying a lubricating composition comprising 50% by weight or more of a polyalkylene glycol or derivative thereof thermally decomposable at 150° C. or above in air and 50% by weight or less of at least one fluorine containing compound selected from the group consisting of (b-1) nonionic fluorine-containing compounds having a fluoroalkyl group of 3 to 20 carbon atoms and a polyoxyalkylene chain, (b-2) compounds having a fluoroalkyl group of 3 to 20 carbon atoms and a residue of a carboxylic acid or a salt thereof with a metallic atom, ammonia or a nitrogen-containing amino compound capable of forming the salt with the carboxylic acid group in the molecule, (b-3) compounds having a fluoroalkyl group of 3 to 20 carbon atoms and a residue of phosphoric acid or a salt thereof with a metallic atom, ammonia or a nitrogen-containing amino compound capable of forming the salt with the phosphoric acid group in the molecule, (b-4) compounds having a fluoroalkyl group of 3 to 20 carbon atoms and a residue of sulfonic acid or a salt thereof with a metallic atom, ammonia or a nitrogen-containing amino compound capable of forming the salt with the sulfonic acid group in the molecule, (b-5) compounds having a fluoroalkyl groups of 3 to 20 carbon atoms and a cationic group containing a quaternary nitrogen atom in the molecule, and (b-6) compounds having a fluoroalkyl group of 3 to 20 carbon atoms and an amphoteric group in the molecule to the metallic or ceramic surfaces kept at 200° C. or above, and treating the metallic or ceramic surfaces while thermally decomposing the component positively on the metallic or ceramic surfaces and converting the lubricating composition into a slightly sticking and piling up sludge consisting of a complex of the formed decomposition product with the component.

2. A method for treating the metallic or ceramic surfaces according to claim 1, wherein the content of the component is 15% or less.

3. A method according to claim 1, wherein said method comprises applying a lubricating composition comprising 99.9% by weight or less of the polyalkylene glycol or the derivative thereof thermally decomposable at 150° C. or above in air and 0.1% by weight or more of
- (b-1) a compound having a perfluoroalkyl group of 3 to 20 carbon atoms, a weight loss ratio of 20% or less at 200° C. at a heating rato of 10° C./min in air and a weight loss ratio of 40% or more on thermal decomposition at 200° C. for 24 hours in air and/or
- (b-2) an alkali metallic salt of a perfluoroalkylsulfonic acid or perfluoroalkylaromatic sulfonic acid, having at least one fluoroalkyl group of 3 to 20 carbon atoms, a weight loss ratio of 5.0% by weight or less at 300° C. at a heating rate of 10° C./min in air and a weight loss ratio of 10% by weight or less on thermal decomposition at 200° C. for 24 hours in air in an amount of 0.1% by weight or more and less than 0.5% by weight based on the weight of polyester multifilamentary yarns having a birefringence of 0.03 to 0.08 and an elongation of 30 to 250% to said multifilamentary yarns, bringing said treated yarns continuously into contact with a contacting body kept at a surface temperature of 215° C. or above at a yarn speed of 500 m/min or higher, and draw-false twist texturing the yarns while positively decomposing thermally the lubricating composition transferred to the contacting body.

4. A method according to claim 1, wherein the content of the component is 50% by weight or more.

5. A method according to claim 1, wherein the component (B-1) is a compound, having a fluoroalkyl group, and consisting of at least one selected from
   (i) nonionic compounds having at least one fluoroalkyl group of 3 to 20 carbon atoms and a polyoxyalkylene chain consisting of 2 to 4 carbon atoms in the same molecule,
   (ii) soap type compounds having said fluoroalkyl group and a salt of a carboxylic acid in the same molecule,
   (iii) compounds having said fluoroalkyl group and a salt of a phosphoric ester in the same molecule,
   (iv) compounds having said fluoroalkyl group and a salt of a sulfate or sulfonate in the same molecule,
   (v) cationic compounds having said fluoroalkyl group and a quaternary nitrogen atom in the same molecule, and
   (vi) amphoteric compounds having said fluoroalkyl group and both anionic and cationic groups in the same molecule.

6. A method according to claim 5, wherein the component (i) in an amount of 50% by weight or less based on the total lubricating composition is used together with at least one of the compounds (ii), (iii), (iv), (v) and (iv) in the lubricating composition.

7. A method according to claim 5, wherein the component (B-1) is the component (i) in an amount of 50% by weight or less based on the total lubricating composition and used together with the component (B-2).

8. A method according to claim 3 or 5, wherein said compounds having the fluoroalkyl group are water-soluble compounds.

9. A method according to claim 3, wherein the contacting body is a grooved heater at a surface temperature of 215° C. or above.

10. A method according to claim 3, wherein the oil pickup of said lubricating composition is 0.2 to 0.45% by weight.

11. A method according to claim 3, wherein the texturing speed is 600 m/min or higher.

12. A method according to claim 3, wherein the draw-false twist texturing is carried out with rotating disks or belts consisting of a ceramic or urethane.

13. A method according to claim 3, wherein the texturing is carried out by the in-draw method.

* * * * *